United States Patent [19]

Stephens

[11] Patent Number: 4,622,641
[45] Date of Patent: Nov. 11, 1986

[54] GEOMETRICAL DISPLAY GENERATOR

[75] Inventor: Lawrence K. Stephens, Dallas, Tex.

[73] Assignee: International Business Machines Corp., Armonk, N.Y.

[21] Appl. No.: 531,651

[22] Filed: Sep. 13, 1983

[51] Int. Cl.⁴ ..................... G06F 15/40; G06F 15/626
[52] U.S. Cl. .................................. 364/518; 340/709; 340/731; 364/521
[58] Field of Search ....................... 340/709, 724, 731; 364/518–522, 720

[56] References Cited

U.S. PATENT DOCUMENTS

| | | | |
|---|---|---|---|
| 4,228,430 | 10/1980 | Iwamura et al. | 340/709 |
| 4,297,694 | 10/1981 | Matherat | 340/731 X |
| 4,354,185 | 10/1982 | Worborschil | 340/731 X |
| 4,400,780 | 8/1983 | Nagao et al. | 364/521 X |
| 4,454,507 | 6/1984 | Srinivasan et al. | 340/709 X |
| 4,506,336 | 3/1985 | Hird | 364/518 |
| 4,532,605 | 7/1985 | Waller | 340/731 X |

FOREIGN PATENT DOCUMENTS

0100798 2/1984 European Pat. Off. ............ 364/521

OTHER PUBLICATIONS

Electronic Design, vol. 28, No. 17, (Aug. 6, 1980), "Refresh Graphics Peripheral Configures to Host System", pp. 123–127.
Microcomputing, Aug. 1980, "Graphics Character Generator", R. B. Moore et al, pp. 106–117.
Texas Instruments Inc., "TI Extended Basic" handbook, 1981, pp. 56–58, 108, 118–120.
IBM Tech. Disc. Bulletin, Oct. 1984, vol. 27, No. 5, "Image Scaling", M. Kikutani, pp. 2984–2986.

Primary Examiner—Errol A. Krass
Assistant Examiner—Kevin J. Teska
Attorney, Agent, or Firm—C. Lamont Whitham

[57] ABSTRACT

A user-friendly procedure for the generation and display of geometric figures on a graphics screen uses a cursor placement device such as a joy stick to both define the initial position and size of the geometrical figure. Two specific examples are described: the generation of a circle and the generation of a square or rectangle. In the first example, the cursor is first positioned to point to the center of the circle at which point a small circle is drawn. The circle is expanded in response to the pressing of a designated key by the user until the desired size is attained. In the second example, the pointing by the cursor is to the upper left corner of the square or rectangle, and the square or rectangle is then expanded in response to the user deflecting the joy stick down and to the right.

5 Claims, 2 Drawing Figures

GEOMETRICAL DISPLAY GENERATOR

RELATED APPLICATION

This application describes a geometrical figure generator that is used to define an alarm window in the invention described in application Ser. No. 06/531,774 entitled "Display System for Monitoring and Alarm System" filed concurrently herewith by Lawrence Keith Stephens now U.S. Pat. No. 4,588,987. The invention described in this application may also be used to advantage in the schematic display generator that is the subject of application Ser. No. 06/499,458 filed by Lawrence Keith Stephens on May 31, 1983, entitled "Schematic Building Cursor Charactor". All of these applications are assigned to a common assignee.

FIELD OF THE INVENTION

The subject invention is generally directed to the generation and display of geometric figures on a graphics screen, and more particularly, the invention is a user-friendly procedure that uses a cursor placement device such as a joy stick to both define the initial position and size of the geometrical figure. By geometrical figure, I mean a predefined figure of generally symmetrical shape such as a circle, square, rectangle or other rhombic figure, triangle, trapezoid, or other polygon.

BACKGROUND OF THE INVENTION

There are many situations in the operation of computer generated graphics displays where the user desires to generate, for example, a circle. Typically, this is done by invoking a circle generating program which requires the user to input first the center of the circle on the graphics display and then to input the radius of the circle. The program then generates a circle with that center and radius on the graphics display. This procedure works well for many applications but presumes prior knowledge of the user as to where and what size the circle should be. In the case of free hand drawings and schematics, the user may not in fact have such prior knowledge and therefore must resort to a tedious trial and error process of graphics generation. Moreover, since the program is specifically written to generate circles, the user has no choice in the generation and display of other geometric figures unless programs are written that are specifically tailored for the desired figures. These problems can be overcome by the use of a digitizer pad as an input to the computer. A digitizer pad would permit the user to generate any size or shape of geometrical figure at any location on the graphics screen, but commercially available digitizer pads are very expensive and are therefore generally used in correspondingly expensive computer aided design (CAD) systems.

SUMMARY OF THE INVENTION

It is therefore an object of the present invention to provide a user-friendly method of drawing geometric figures on a graphics screen.

It is a further object of the invention to provide a procedure for drawing geometric figures on a graphics screen which is both easy to use and is practiced with relatively inexpensive hardware.

The foregoing and other objects of the invention are accomplished by using an inexpensive cursor positioning device such as a joy stick, track ball or "mouse". The preferred embodiment of the invention is described in terms of a joy stick being the cursor positioning element, but it will be understood by those skilled in the art that other well known devices such as track balls and "mice" which are used as cursor positioning elements can be used just as effectively as the joy stick. In addition to the joy stick, an ENTER key is required for the practice of the invention, but many cursor positioning devices are equipped with one or more buttons, one of which can be used to provide the function of the ENTER key. In the practice of the invention, the type of geometric figure is chosen, typically from a menu displayed for that purpose, and then the user is prompted to point to the desired location of the figure. The user accomplishes this by moving the cursor to the desired location and pressing the ENTER key. At this point, the cursor is XORed to remove it from the screen, and an initial small sized geometrical figure of the type chosen is drawn on the screen. The user then uses the joy stick to cause the figure to increase in size. When the desired size has been attained, the user indicates this by pressing the ENTER key. At this point, size and position of the geometrical figure is stored and the cursor is redisplayed.

The location of the cursor for the original pointing of location may conveniently be the center of the geometric figure. In the preferred embodiment of the invention, the center is in fact chosen for the generation of circles, but the center is not the only location that may be used for the pointing of location of the geometric figure. In my copending application Ser. No. 06/531,774 entitled "Display for Monitoring and Alarm System" now U.S. Pat. No. 4,588,987, I generate boxes which are used as alarm windows on schematic displays. The convention I have chosen in that application is to require the user to point to the upper left corner of the box. The box increases in size to the right horizontally and vertically downwardly from this point as the user moves the joy stick down and to the right. Obviously other conventions will suggest themselves to those of ordinary skill in the art based on the following detailed description of the invention.

BRIEF DESCRIPTION OF THE DRAWINGS

The foregoing and other objects, aspects and advantages of the invention will be better understood from the following detailed description of the invention taken with reference to the accompanying drawings in which.

DETAILED DESCRIPTION OF THE INVENTION

Figure 1:
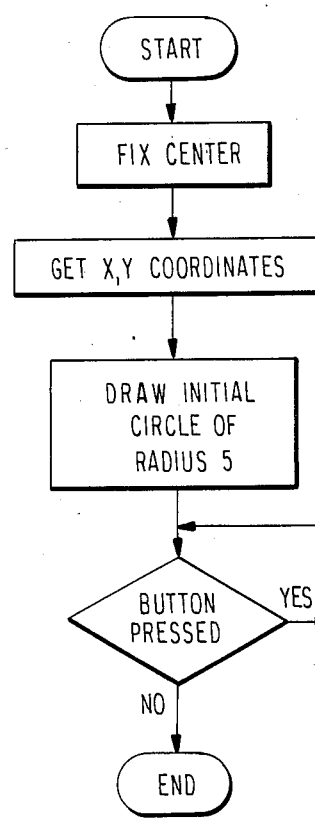
FIG. 1 is a flow chart illustrating in simplified form one specific example of drawing a circle according to the techniques of the invention.

The invention will be described by way of specific examples adapted for use on the IBM Personal Computer. Obviously, the invention is not limited to this specific microcomputer system or even to microcomputer systems and may have useful application to minicomputer systems or even main frame computer systems. However, the invention is particularly useful in microcomputer systems because of the relative economies of such systems and the fact that the invention is itself correspondingly inexpensive.

The first example is the drawing of a circle. The program, which is set forth in more detail hereinafter, presumes that the circle drawing process is used in conjunction with the schematic generator described in my earlier copending application Ser. No. 06/499,458 entitled "Schematic Building Cursor Character". In that application, the cursor symbol is chosen from among a plurality of symbols in a symbol table. These symbols are used in the actual construction of the schematic display by placing the symbols at desired locations on the graphics screen and then reading them into memory in response to an interrupt signal produced by the operator pressing a button on the joy stick control. Thus, the first steps in the specific example given of generating a circle involve the exclusive ORing of the old cursor symbol to remove it from the graphics screen and saving the old symbol height and width for later recall. Then, the new cursor symbol's height and width is initialized and the new cursor symbol is exclusive ORed onto the graphics screen. Typically, the new cursor symbol is a conventional small square or rectangle and may blink on and off. Clearly, if the circle generation technique according to the invention were to be used in an environment where the cursor symbol was not initially a schematic character symbol, then the process of exclusive ORing the old cursor symbol and saving its dimensions would not be required.

The user enters the circle generation mode by making the appropriate selection from a menu. Once in the circle mode, the user is prompted to point to the location on the graphics screen where s/he would like the center of the circle. This is done by moving the joy stick, but as previously mentioned, other cursor positioning devices could be used. When the cursor is positioned to the desired location of the center of the circle, the user presses the button on the joy stick or the ENTER key to signify selection. The button pressing generates an interrupt which is trapped by the program and control is passed to a subroutine which sets a flag signifying the occurance. Control returns to the program's main loop which checks the flag at a designated point and gives control to the circle routine. The circle routine first exclusive ORs the cursor off the screen and then prompts the user with various circle options. These include change of color (by pressing function key F9), terminate circle expansion (by pressing function key F10), and expand the circle one pixel in radius (by pressing the joy stick button). The circle routine begins by drawing an initial three pixel circle at the initial pointing and starts looping until the function key F10 is pressed. Inside the loop, if function key F9 is pressed, the color variable is changed. Also, the old circle is continuously removed from the screen by exclusive ORing and the position and size data of the old circle are saved. If during this operation and joy stick button or the "+" key is pressed, the radius variable is increased by one pixel and compared to a maximum value of 30. If it is greater than 30, then it is set equal to 30. The new circle is then drawn on the screen. After the function key F10 has been pressed signifying that the user wants the circle expansion to terminate, the circle position and size are saved and the user is prompted to select a fill color for the circle. The user makes a selection from a menu provided for that purpose, and the circle is then filed with the selected color. At this point in the routine, the routine returns to the point in the program at which the circle generation routine was entered. The FIG. 1 is a flow chart which illustrates the circle drawing process just described.

Those skilled in the art will recognize that various modifications can be made from the basic procedure just described for circle generation. First, while the specific example is described in terms of a color graphics embodiment where both the circumference of the circle and the interior of the circle may be selected to have different colors, the procedure is equally well suited for monochrome graphics without these choices of color. The basic technique is the ability to point to the desired center of the circle with the cursor and then to expand the circle until the desired size has been reached. Second, while the specific example requires the user to press either the button on the joy stick or the "+" key to expand the circle by one pixel increments, some other key or control can be used to accomplish the same result. For example, the joy stick which was originally used to move the cursor to point to the center of the circle could, after the joy stick button or the ENTER key was pressed, then be used to expand the circle by pushing the joy stick in one direction until the desired size was reached. The use of the joy stick for this function would make possible user control in how fast the circle expanded in size, i.e. a slight deflection of the joy stick would produce a slow expansion and a greater deflection of the joy stick would produce a correspondingly greater expansion rate of the circle. Also, it would be possible to decrease the size of the circle by moving the joy stick in the opposite direction. A similar result could be achieved by pressing the "−" key.

Figure 2:
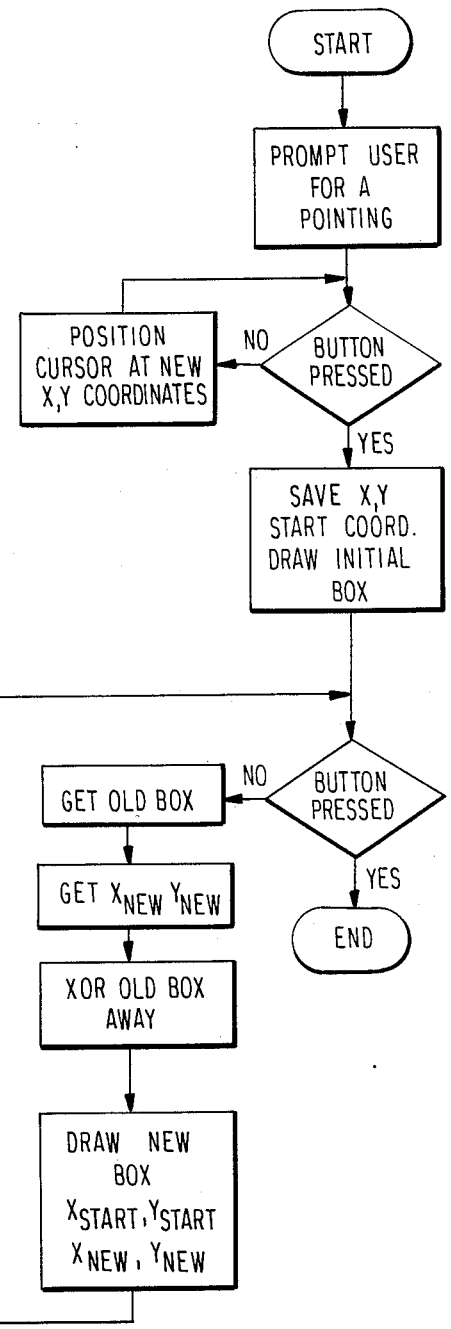
FIG. 2 is a flow chart illustrating in simplified form another specific example of drawing a box or rectangle according to the techniques of the invention.

The next specific example is the drawing of a square or a rectangle. This example is used in my copending application Ser. No. 06/531,774 entitled "Display for Monitoring and Alarm System", now U.S. Pat. No. 4,588,987, and is used to define an alarm window. The chief differences between this example and the specific example of drawing a circle are that (1) the pointing with the cursor is not made to the center of the geometric figure and (2) expansion of the figure is accomplished by manipulating the joy stick. More specifically, the pointing is made to the upper left corner of the square or rectangle. Expansion of the square or rectangle is then accomplished by deflecting the joy stick down and to the right. FIG. 2 is a flow chart which illustrates the box or rectangle drawing process just described.

From these specific examples, those skilled in the art will understand that the basic principles of the invention can be expanded to include many other geometric figures of generally symmetrical shape that are susceptible of being stored in a graphics character memory. These figures require some predefined symmetry upon which expansion in one pixel increments is based. For example, in the circle case, expansion is based on increasing the radius by one pixel increments. In the square or rectangle case, expansion is based on increasing the horizontal x and vertical y dimensions in one pixel increments or some ratio of x to y dimensions.

The following is a listing of the applicant's schematic generator program which includes the complete programs for the two specific examples described hereinabove, which program was written using the IBM Personal Computer BASIC Compiler, version 1.00:

```
001A  0002    '
001A  0002    on error goto 31300
0035  0002    '
0035  0002    defint a-z
0036  0002    gosub 30000  ' turn off all function keys
003B  0002    key off
0041  0002    chrh = 36
0048  0004    chrw = 48
004F  0006    deadband = 20
0056  0008    xmax = 319
005D  000A    ymax = 199
0064  000C    x = 160
006B  000E    y = 100
0072  0010    nofilefl = 0
0079  0012    numbsymb = 128
0080  0014    speed = 1
0087  0016    stateflag = 1
008E  0018    dim boxsel(904)
008F  072A    rotatesym = 0
0096  072C    '
0096  072C    boxoff = 456
009D  072E    bigboxoff = 496
00A4  0730    smalloff = 980
00AB  0732    blueoff = 1554
00B2  0734    greenoff = 1594
00B9  0736    redoff  = 1634
00C0  0738    whiteoff = 1674
00C7  073A    symbtoff = 1714
00CE  073C    newsymboff = 8000
00D5  073E    '
00D5  073E    oldoff = 20
00DC  0740    ochrh = chrh
00E3  0742    ochrw = chrw
00EA  0744    startnbr = 0
00F1  0746    selflag = 0
00F8  0748    button = 0
00FF  074A    entryflg = 0
0106  074C    '
0106  074C    '    DDT record's arrays
0106  074C    '
0106  074C    dim entry(30)
0107  078A    dim typeddt(30)
0108  07C8    dim ulxchar(30)
0109  0806    dim ulychar(30)
010A  0844    dim alarm(30)
010B  0882    dim ulxvalue(30)
010C  08C0    dim ulyvalue(30)
010D  08FE    dim boxsizex(30)
010E  093C    dim boxsizey(30)
010F  097A    ddtrecno = 0
0116  097C    dim colr(3000)
0117  20EE    dim xnew(3000)
0118  3860    dim ynew(3000)
0119  4FD2    '
0119  4FD2    initflag = 0
0120  4FD4    colorflg = 0
0127  4FD6    joyx = 0
```

```
012E  4FD8    joyy = 0
0135  4FDA    '
0135  4FDA    '     Variables for the symbol generator
0135  4FDA    '
0135  4FDA    dim box0(8)
0136  4FEC    dim box1(8)
0137  4FFE    dim box2(8)
0138  5010    dim box3(8)
0139  5022    xbox = 1
0140  5024    ybox = 1
0147  5026    xboxmin = 1
014E  5028    yboxmin = 1
0155  502A    xboxmax = 196
015C  502C    yboxmax = 146
0163  502E    xreal = 278
016A  5030    yreal = 1
0171  5032    '
0171  5032    '
0171  5032    '     To enable the user to change colors quickly,
0171  5032    '     it became necessary to read in some data points
0171  5032    '     These represent bit masks for identifying
0171  5032    '     colors.
0171  5032    '     Here is where they are read from a data statement.
0171  5032    '
0171  5032    dim newcolor(15)
0172  5052    '
0172  5052    dim chcolor(31)
0173  5092    '
0173  5092    dim coloro(3)
0174  509A    '
0174  509A    '     newcolor = the array of new color masks
0174  509A    '
0174  509A    for i = 0 to 15
017A  509A        read newcolor(i)
0188  509C    next i
0197  509C    '
0197  509C    '     chcolor = the array of original masks to be recognized
0197  509C    '                and changed.
0197  509C    '
0197  509C    for i = 0 to 31
019D  509C        read chcolor(i)
01AB  509C    next i
01BA  509C    '
01BA  509C    '     coloro = offset values for the individual colors
01BA  509C    '              into the 2 mask arrays.
01BA  509C    '
01BA  509C    for i = 0 to 3
01C0  509C        coloro(i) = i * 8
01D5  509C    next i
01E4  509C    '
01E4  509C    '
01E4  509C    '
01E4  509C    '   offset2 is the offset past the offsets and number of
01E4  509C    '   symbols into the actual symbols in the symbol table.
01E4  509C    '   initially it is set to reflect the default symbol table
01E4  509C    '
01E4  509C    offset2 = 258
```

```
01EB   509E    '
01EB   509E    '     get segment register from dos offset
01EB   509E    '
01EB   509E    def seg = 0
01F1   509E    storage = peek(&h3fe) + 256 * peek(&h3ff)
0224   50A0    def seg = storage
022C   50A0    '
022C   50A0    ' initial cursor will be the duck
022C   50A0    '
022C   50A0    bload "worksym.sym",20
0236   50A0    '
0236   50A0    '    set up color blocks
0236   50A0    '
0236   50A0    for i = 0 to 3
023C   50A0    '
023C   50A0        off1 = i * 40
0247   50A2        poke blueoff + off1, 20
025B   50A2        poke blueoff + off1 + 1, 0
026F   50A2        poke blueoff + off1 + 2, 12
0285   50A2        poke blueoff + off1 + 3, 0
029B   50A2    '
029B   50A2        if i = 0 then ij = 0
02AD   50A4        if i = 1 then ij = 85
02BF   50A4        if i = 2 then ij = 170
02D1   50A4        if i = 3 then ij = 255
02E3   50A4        for j = 4 to 39
02EA   50A4            poke blueoff + j + off1, ij
0304   50A6        next j
0313   50A6    '
0313   50A6    next i
0325   50A6    '
0325   50A6    ' initial symbol table will be defaulted
0325   50A6    '
0325   50A6        bload "DEFAULT.SYM",symbtoff
0330   50A6    '
0330   50A6        def seg
0334   50A6    '
0334   50A6    '   get the joystick settings
0334   50A6    '
0334   50A6        gosub 22000
0339   50A6    '
0339   50A6        gosub 15000    ' switch to the graphics tube
033E   50A6    '
033E   50A6        gosub 502 ' display prompts
0343   50A6    '
0343   50A6        soff = 20
034A   50A8        call overlay( x, y, storage, soff)
0363   50A8    '
0363   50A8    '
0363   50A8    '   Turn on the joystick button
0363   50A8    '
0363   50A8    strig(0) on
0369   50A8    on strig(0) gosub 70
0372   50A8    '
0372   50A8    '   Set up the joystick qualifiers
0372   50A8    '
0372   50A8        nxvar = xvar - deadband
```

```
037D  50AC        xvar = xvar + deadband
0388  50AC        xvar1 = xvar + 20
0392  50AE        nxvar1 = nxvar - 20
039C  50B0        xvar2 = xvar1 + 40
03A6  50B2        nxvar2 = nxvar1 - 40
03B0  50B4     '
03B0  50B4        nyvar = yvar - deadband
03BB  50B8        yvar = yvar + deadband
03C6  50B8        yvar1 = yvar + 20
03D0  50BA        nyvar1 = nyvar - 20
03DA  50BC        yvar2 = yvar1 + 40
03E4  50BE        nyvar2 = nyvar1 - 40
03EE  50C0     '
03EE  50C0        def seg = storage
03F6  50C0     '
03F6  50C0     '  If monochrome is attached put up the help screen
03F6  50C0     '
03F6  50C0        if peek(14) = 1 then gosub 31400
0411  50C0     '
0411  50C0     switch = 1
0418  50C2     while switch
0424  50C2     '
0424  50C2        xold = x
042B  50C4        yold = y
0432  50C6        osoff = soff
0439  50C8        if key2 = 71 then x = x - speed: y = y - speed
045A  50CA        if key2 = 72 then y = y - speed
0470  50CA        if key2 = 73 then x = x + speed: y = y - speed
0491  50CA        if key2 = 75 then x = x - speed
04A7  50CA        if key2 = 77 then x = x + speed
04BD  50CA        if key2 = 79 then x = x - speed: y = y + speed
04DE  50CA        if key2 = 80 then y = y + speed
04F4  50CA        if key2 = 81 then x = x + speed: y = y + speed
0515  50CA        key2 = 0
051C  50CA        if joystick <> 0 then gosub 5
052C  50CC     '
052C  50CC     '  Check cursor positioning
052C  50CC     '
052C  50CC        gosub 2
0531  50CC     '
0531  50CC     '
0531  50CC     '  Continually xor the cursor onto the screen.
0531  50CC     '
0531  50CC        if stateflag = 5 or stateflag = 8 then gosub 3010
0556  50CC        if stateflag = 7 then gosub 41 else if stateflag <> 5 and
                  stateflag <> 8 then gosub 10
058E  50CC     '
058E  50CC     '  Handle below the display line functions
058E  50CC     '
058E  50CC        if colorflg = 0 then if y + chrh > 176 then entryflg = 1:
                  gosub 3
05B5  50CC        if colorflg = 0 then if entryflg > 0 then if y + chrh < 17
                  2 then initflag = 0: stateflag = 1: gosub 14800: gosub 9: gosub
                  502
05F8  50CC     '
05F8  50CC     '  get key input from the user.
05F8  50CC     '
```

```
05F8   50CC        if button = 1 then gosub 1000 ' switch checker
0608   50CC        button = 0
060F   50CC    '
060F   50CC        k$ = inkey$
0618   50D0        if k$ <> "" then if len(k$) < 2 then gosub 55 else gosub 6
                  0
0641   50D0    '
0641   50D0    '
0641   50D0    wend
0645   50D0    '
0645   50D0    end
0649   50D0    '
0649   50D0    1 '
064A   50D0    '
064A   50D0    '   Display prompt lines
064A   50D0    '
064A   50D0        locate 24,1
0657   50D0        print "Symbol   Display  Load   Overlay    Erase";
065F   50D0        locate 25,1
066C   50D0        print "Color    Reset    Text   File       Associate";
0674   50D0    '
0674   50D0        return
0677   50D0    '
0677   50D0    2 '
0678   50D0    '
0678   50D0    '   Check x and y positioning and adjust accordingly
0678   50D0    '
0678   50D0        if x + chrw > xmax  then x = xmax - chrw else if x < 0 the
                  n x = 0
06A9   50D0        if y + chrh > ymax  then y = ymax - chrh else if y < 0 the
                  n y = 0
06DA   50D0    '
06DA   50D0        return
06DD   50D0    '
06DD   50D0    3 '
06DE   50D0    '
06DE   50D0    '   Handle positioning of the cursor
06DE   50D0    '   And branch accordingly.
06DE   50D0    '
06DE   50D0    '   reset state flag to reflect the proper state
06DE   50D0    '   Default = Place (1)
06DE   50D0    '
06DE   50D0        if stateflag = 2 then: stateflag = 1: gosub 14800: gosub 5
                  02: return
06FD   50D0    '
06FD   50D0    '   Change cursor, set state for selection, and prompt user.
06FD   50D0    '
06FD   50D0        if selflag = 0 then gosub 4: stateflag = 0: gosub 502: cal
                  l overlay(x, y, storage, soff): selflag = 1
0739   50D0    '
0739   50D0    '
0739   50D0    '   Note: no changing of the true character to anything else
0739   50D0    '         should go above here.
0739   50D0    '
0739   50D0        xch = x + 1
0741   50D2        ych = y + 1
0749   50D4    '
```

| | | |
|---|---|---|
| 0749 | 50D4 | `if ych < 192 then gosub 31000 else if ych > 191 then gosub 31100` |
| 076E | 50D4 | `'` |
| 076E | 50D4 | `gosub 8` |
| 0773 | 50D4 | `button = 0` |
| 077A | 50D4 | `'` |
| 077A | 50D4 | `return` |
| 077D | 50D4 | `4 '` |
| 077E | 50D4 | `'` |
| 077E | 50D4 | `' Change to the degrees` |
| 077E | 50D4 | `'` |
| 077E | 50D4 | `quadnew = 0` |
| 0785 | 50D6 | `quadold = 0` |
| 078C | 50D8 | `call overlay(x, y, storage, soff)` |
| 07A5 | 50D8 | `befselx = x` |
| 07AC | 50DA | `befsely = y` |
| 07B3 | 50DC | `oldoff = soff` |
| 07BA | 50DC | `soff = smalloff ' initially a degrees sign` |
| 07C1 | 50DC | `ochrh = chrh` |
| 07C8 | 50DC | `ochrw = chrw` |
| 07CF | 50DC | `chrh = 3` |
| 07D6 | 50DC | `chrw = 3` |
| 07DD | 50DC | `y = 187` |
| 07E4 | 50DC | `'` |
| 07E4 | 50DC | `return` |
| 07E7 | 50DC | `'` |
| 07E7 | 50DC | `5 '` |
| 07E8 | 50DC | `'` |
| 07E8 | 50DC | `' Joystick subroutine` |
| 07E8 | 50DC | `'` |
| 07E8 | 50DC | `    x2 = stick(0)` |
| 07F2 | 50DE | `    y2 = stick(1)` |
| 07FD | 50E0 | `'` |
| 07FD | 50E0 | `    if x2 > xvar then joyx = joyx + 1 else if x2 < nxvar then joyx = joyx - 1` |
| 082A | 50E0 | `    if y2 > yvar then joyy = joyy + 1 else if y2 < nyvar then joyy = joyy - 1` |
| 0857 | 50E0 | `'` |
| 0857 | 50E0 | `    if joyx > 6 then x = x + speed: joyx = 0` |
| 0874 | 50E0 | `    if joyy > 6 then y = y + speed: joyy = 0` |
| 0891 | 50E0 | `    if joyx < -6 then x = x - speed: joyx = 0` |
| 08AE | 50E0 | `    if joyy < -6 then y = y - speed: joyy = 0` |
| 08CB | 50E0 | `'` |
| 08CB | 50E0 | `    if x2 > xvar1 then x = x + SPEED else if x2 < nxvar1 then x = x - SPEED` |
| 08FE | 50E0 | `    if y2 > yvar1 then y = y + SPEED else if y2 < nyvar1 then y = y - SPEED` |
| 0931 | 50E0 | `'` |
| 0931 | 50E0 | `    if x2 > xvar2 then x = x + SPEED * 3 else if x2 < nxvar2 then x = x - SPEED * 3` |
| 096E | 50E0 | `    if y2 > yvar2 then y = y + SPEED * 3 else if y2 < nyvar2 then y = y - SPEED * 3` |
| 09AB | 50E0 | `'` |
| 09AB | 50E0 | `return` |
| 09AE | 50E0 | `'` |
| 09AE | 50E0 | `8 '` |
| 09AF | 50E0 | `'` |

```
09AF  50E0   '    If first row of choices is selected then distinguish the
09AF  50E0   '    function.
09AF  50E0   '
09AF  50E0   '    locate 2,1
09AF  50E0   '    print "HS:  x = y = ";x;y;
09AF  50E0   '
09AF  50E0        if quadnew = 1 and button = 1 then gosub 230: return ' Se
             lect new cursor character
09D7  50E0        if quadnew = 2 and button = 1 then gosub 250: return ' di
             play symbol table
09FF  50E0        if quadnew = 3 and button = 1 then gosub 240: return' load
             new symbol table
0A27  50E0        if quadnew = 4 and button = 1 then stateflag = 3: gosub 40
             0: return ' overlay
0A56  50E0        if quadnew = 5 and button = 1 then stateflag = 2: gosub 40
             0: return ' Erase mode
0A85  50E0   '
0A85  50E0   '    If second row of choices is selected then determine the
0A85  50E0   '    function.
0A85  50E0   '
0A85  50E0   '    locate 3,1
0A85  50E0   '    print "HS:  x = y = ";x;y;
0A85  50E0   '
0A85  50E0        if quadnew = 6 and button = 1 then stateflag = 10 : messag
             e$ = "Point to color to change and press RED"
0AB5  50E4        if quadnew = 6 and button = 1 then gosub 800: return ' ch
             ange color
0ADD  50E4        if quadnew = 7 and button = 1 then gosub 700: return ' re
             set
0B05  50E4        if quadnew = 8 and button = 1 then gosub 950: return ' tex
             t
0B2D  50E4        if quadnew = 9  and button = 1 then gosub 1800: return ' f
             ile
0B55  50E4        if quadnew = 10 and button = 1 then stateflag = 4: gosub 4
             00 ' associate
0B81  50E4   '
0CE3  50E8        return
0CE6  50E8   '
0CE6  50E8   42 '
0CE7  50E8   '
0CE7  50E8   '    text putter
0CE7  50E8   '
0CE7  50E8        put (xold, yold), boxsel, pset
0CFB  50E8        put (xold, yold), boxsel, xor
0D10  50E8   '
0D10  50E8        return
0D13  50E8   '
0D13  50E8   55 '
0D14  50E8   '
0D14  50E8   '    Handle the few normal keys we handle
0D14  50E8   '
0D14  50E8        if k$ = "" then return
0D25  50E8        key2 = asc(k$)
0D2F  50E8        if key2 = 43 then button = 1 else beep
0D48  50E8        for q = 0 to 100: d = 0:next
0D64  50EC        return
0D67  50EC   '
```

```
0B81    50E4          return
0B84    50E4      '
0B84    50E4    9 '
0B85    50E4      '
0B85    50E4      '   Clear extra graphics area
0B85    50E4      '
0B85    50E4          yput = 178
0B8C    50E6          xput = 310
0B93    50E8          call place(xput, yput, storage, blueoff)
0BAC    50E8          yput = 188
0BB3    50E8          call place(xput, yput, storage, blueoff)
0BCC    50E8      '
0BCC    50E8          return
0BCF    50E8      '
0BCF    50E8    10 '
0BD0    50E8      '
0BD0    50E8      '   xor the screen with the cursor character.
0BD0    50E8      '
0BD0    50E8          call overlay( xold, yold, storage, osoff)
0BE9    50E8          call overlay( x, y, storage, soff)
0C02    50E8      '
0C02    50E8          return
0C05    50E8      '
0C05    50E8    20 '
0C06    50E8      '
0C06    50E8      '   pset the current cursor character
0C06    50E8      '
0C06    50E8          call place (x, y, storage, soff)
0C1F    50E8          call overlay(x, y, storage, soff)
0C38    50E8      '
0C38    50E8          return
0C3B    50E8    30 '
0C3C    50E8      '
0C3C    50E8      '   erase the current cursor area
0C3C    50E8      '
0C3C    50E8          locate 24,1
0C49    50E8          call place(x, y, storage, blueoff)
0C62    50E8          call overlay(x, y, storage, soff)
0C7B    50E8      '
0C7B    50E8          return
0C7E    50E8      '
0C7E    50E8    40 '
0C7F    50E8      '
0C7F    50E8      '       xor the symbol
0C7F    50E8      '
0C7F    50E8          call overlay(x, y, storage, soff)
0C98    50E8          for i = 0 to 1000: j = 0: next i
0CB5    50E8      '
0CB5    50E8          return
0CB8    50E8      '
0CB8    50E8    41 '
0CB9    50E8      '
0CB9    50E8      '   text handler
0CB9    50E8      '
0CB9    50E8          put (xold,yold), boxsel, xor
0CCE    50E8          put (x, y), boxsel, xor
0CE3    50E8      '
```

```
0D67   50EC    60 '
0D68   50EC    '
0D68   50EC    '    handle extended keys
0D68   50EC    '
0D68   50EC    '
0D68   50EC        k$ = right$(k$,1)
0D78   50EC        key2 = asc(k$)
0D82   50EC        if key2 > 58 and key2 < 69 then key2 = key2 - 58 else retu
               rn
0DB2   50EC    '
0DB2   50EC    '    do not allow a switch of states during a function.
0DB2   50EC    '
0DB2   50EC        if stateflag <> 1 and stateflag <> 3 then return
0DD5   50EC    '
0DD5   50EC        on key2 gosub  300, 300, 15900, 1100,   1900 ,2000,  1700,
                16000,           17000,  29000
0DF1   50EC    '
0DF1   50EC    '                         +    -   end  line  circle  box   screen
               gen symbol rotate  confirm
0DF1   50EC    '                         cursor speed
0DF1   50EC    '
0DF1   50EC        return
0DF4   50EC    '
0DF4   50EC    70 '
0DF5   50EC    '
0DF5   50EC    '    Joystick has been pushed
0DF5   50EC    '
0DF5   50EC        button = 1
0DFC   50EC        for q = 0 to 100: d = 0:next
0E1B   50EC        return
0E1B   50EC    '
0E1B   50EC    100 '
0E1C   50EC    '
0E1C   50EC    '    F1 will speed up the cursor each time it is pressed.
0E1C   50EC    '
0E1C   50EC        speed = speed + 1
0E24   50EC        return
0E27   50EC    '
0E27   50EC    200.'
0E28   50EC    '
0E28   50EC    '    F2 will slow down the cursor each time it is pressed.
0E28   50EC    '
0E28   50EC        speed = speed - 1
0E30   50EC        if speed < 1 then speed = 1
0E42   50EC    '
0E42   50EC        return
0E45   50EC    '
0E45   50EC    230 '
0E46   50EC    '
0E46   50EC    '    Prompt for entry number
0E46   50EC    '
0E46   50EC        gosub 14800
0E4B   50EC    '
0E4B   50EC    233 '
0E4C   50EC    '
0E4C   50EC    '    This will allow entry from Pf key 2
0E4C   50EC    '
```

```
0E4C    50EC            switch1 = 1
0E53    50EE            while switch1
0E5F    50EE                numdisp$ = str$(numbsymb - 1)
0E6D    50F2                a = 4 - len(numdisp$)
0E7B    50F4                numdisp$ = string$(a, " ") + numdisp$
0E90    50F4                message$ = "Enter table entry 0 -" + numdisp$ + " [    ]"
0EA4    50F4                inputcol = 28
0EAB    50F6                gosub 29010
0EB0    50F6                input;"", num$
0EC0    50FA                if val(num$) > numbsymb - 1 or val(num$) < 0 then gosub 231
                    else gosub 232
0F03    50FA            wend
0F07    50FA        '
0F07    50FA        '   Clean-up and return
0F07    50FA        '
0F07    50FA            stateflag = 1
0F0E    50FA            gosub 502
0F13    50FA            return
0F16    50FA        '
0F16    50FA    231 '
0F17    50FA        '
0F17    50FA        '   bad entry of symbol number
0F17    50FA        '
0F17    50FA            numdisp$ = num$
0F20    50FA            a = 4 - len(numdisp$)
0F2E    50FA            numdisp$ = string$(a, " ") + numdisp$
0F43    50FA            message$ = "Entry:" + numdisp$ + "  was invalid. Retry? Y
                    /N [ ]"
0F57    50FA            inputcol = 38
0F5E    50FA            gosub 29010
0F63    50FA            input;"",y$
0F73    50FE            if y$ <> "Y" and y$ <> "y" then switch1 = 0
0F9D    50FE            return
0FA0    50FE        '
0FA0    50FE    232 '
0FA1    50FE        '
0FA1    50FE        '   Good symbol number entered, so  get the symbol number.
0FA1    50FE        '
0FA1    50FE            call overlay( x, y, storage ,soff)    ' clean up the old c
                    ursor
0FBA    50FE            symnum = val(num$)
0FC7    5100            gosub 14000     ' get the new symbol
0FCC    5100        '
0FCC    5100        '   reset the cursor
0FCC    5100        '
0FCC    5100            gosub 2
0FD1    5100            call overlay( x, y, storage, soff)
0FEA    5100        '
0FEA    5100        '   Re-initialize the old offsets to reflect the new character
                    '
0FEA    5100        '
0FEA    5100            ochrw = chrw
0FF1    5100            ochrh = chrh
0FF8    5100        '
0FF8    5100            oldoff = soff
0FFF    5100        '
0FFF    5100            switch1 = 0
```

```
1006  5100         return
1009  5100      '
1009  5100      240 '
100A  5100      '
100A  5100      '  This will be the driver for the change symbol table code
100A  5100      '
100A  5100      gosub 14800 ' cleanup the arrow
100F  5100      '
100F  5100      switch1 = 1    ' initialize the loop
1016  5100      '
1016  5100      while switch1
1022  5100          nofilefl = 0
1029  5100          message$ = "Symbol table? [           ]"
1032  5100          inputcol = 16
1039  5100          gosub 29010   ' set up for prompt input
103E  5100          input;"",symbolt$
104E  5104          if len(symbolt$) > 10 then gosub 241 else gosub 242
1069  5104      wend
106D  5104      '
106D  5104      '   Clean-up and head home
106D  5104      '
106D  5104      stateflag = 1
1074  5104      gosub 502
1079  5104      return
107C  5104      '
107C  5104      241 '
107D  5104      '
107D  5104      '    This code re-prompts if table name too long.
107D  5104      '
107D  5104          nofilefl = 1
1084  5104          message$ = "Name too long, try again? Y/N [ ]"
108D  5104          inputcol = 32
1094  5104          gosub 29010 ' prompt
1099  5104          input;"",y$
10A9  5104          if y$ <> "Y" and y$ <> "y" then switch1 = 0
10D3  5104          return
10D6  5104      '
10D6  5104      '  This subroutine will check for existence of the table.
10D6  5104      '
10D6  5104      '
10D6  5104      242 '
10D7  5104          on error goto 243
10DE  5104          file$ = symbolt$ + ".SYM"
10EC  5108          open file$ for input as #3
10FD  5108          on error goto 31300
1104  5108          if (switch1 = 1) and (nofilefl = 0) then gosub 244
1129  5108          return
112C  5108      '
112C  5108      243 '
112D  5108      '
112D  5108      '   This code handles disk errors for symbol table
112D  5108      '
112D  5108          nofilefl = 1
1134  5108          message$ = "Table not found, try again? Y/N [ ]"
113D  5108          inputcol = 34
1144  5108          gosub 29010 ' handle prompt
```

```
1149   5108         input;"",y$
1159   5108         if y$ <> "Y" and y$ <> "y" then switch1 = 0
1183   5108         resume next
1187   5108       '
1187   5108   244 '
1188   5108       '
1188   5108       '   This code loads the symbol table
1188   5108       '
1188   5108           close #3
118F   5108       '
118F   5108       '   Clean up the old cursor and load the first item initially
118F   5108       '
118F   5108           call overlay( x, y, storage, soff)
11A8   5108           def seg = storage
11B0   5108           bload file$,symbtoff
11BB   5108           switch1 = 0
11C2   5108       '
11C2   5108       '   numbsymb = number of entries in the symbol table
11C2   5108       '
11C2   5108           numbsymb = peek(symbtoff) + 256 * peek(symbtoff + 1)
11FB   5108           def seg
11FC   5108       '
11FC   5108       '   offset2 must be re-calculated
11FC   5108       '
11FC   5108           offset2 = numbsymb * 2 + 2
1209   5108       '
1209   5108           symnum = 0
1210   5108           gosub 14000  'get new character
1215   5108       '
1215   5108       '   Check the positioning and put up the new symbol
1215   5108       '
1215   5108           gosub 2
121A   5108           stateflag = 1
1221   5108           gosub 502
1226   5108       '
1226   5108           call overlay( x, y, storage, soff)
123F   5108       '
123F   5108           return
1242   5108       '
1242   5108   250 '
1243   5108       '
1243   5108       '   Display symbol table function
1243   5108       '
1243   5108       '
1243   5108       '   Clean-up the degrees.
1243   5108       '
1243   5108           gosub 14800
1248   5108       '
1248   5108       '   Push the offset
1248   5108       '
1248   5108           toff = soff
124F   510A         ochrh = chrh
1256   510A         ochrw = chrw
125D   510A       '
125D   510A       '   save screen away
125D   510A       '
125D   510A           def seg = &hb800
```

```
1264  510A        bsave "screen.scr",0,&h4000
1270  510A        def seg
1274  510A        startnbr = 0
127B  510A        gosub 255
1280  510A      '
1280  510A        switch1 = 1
1287  510A        while switch1
1293  510A   251    k$ = inkey$
129C  510A          if k$ <> "" then k$ = right$(k$,1) else 251
12C0  510A          key2 = asc(k$)
12CA  510A          if key2 > 58 and key2 < 68 then gosub 252
12EF  510A        wend
12F3  510A      '
12F3  510A      ' re-display screen, cleanup pointers and return
12F3  510A      '
12F3  510A        cls
12F7  510A        def seg = &hb800
12FE  510A        bload "screen.scr",0
1307  510A        def seg
130B  510A      '
130B  510A      ' Pop stack to get the good offsets
130B  510A      ' re-initialize the prompt and switches
130B  510A      '
130B  510A        soff = toff
1312  510A        oldoff = soff
1319  510A        chrh = ochrh
1320  510A        chrw = ochrw
1327  510A      '
1327  510A        stateflag = 1
132E  510A        gosub 502
1333  510A      '
1333  510A        return
1336  510A      '
1336  510A   252 '
1337  510A      '                 f7           f8        f2
1337  510A      '  If key2 = 65 then previous, 66 = next, 60 = quit
1337  510A      '
1337  510A        if key2 = 60 then switch1 = 0: return
134C  510A        locate 24,1
1359  510A        if key2 = 66 then startnbr = startnbr + 15
136E  510A        if key2 = 65 then startnbr = startnbr - 15
1383  510A        if startnbr > numbsymb - 1 then startnbr = numbsymb - 1: print "Press F2 to quit";: return
13A5  510A        if startnbr < 0 then startnbr = 0
13B7  510A        key2 = 0
13BE  510A        gosub 255
13C3  510A        return
13C6  510A      '
13C6  510A   255 '
13C7  510A      '
13C7  510A      ' Display 14 members of a symbol table
13C7  510A      '
13C7  510A        if startnbr < 0 then return
13D5  510A      '
13D5  510A        cls
13D9  510A      '
```

```
13D9  510A       locate 1,12
13E6  510A       print "Symbol Table Display";
13EE  510A       endnbr = startnbr + 14
13F8  510C       if endnbr > numbsymb - 1 then endnbr = numbsymb - 1
140F  510C       hor = 1
1416  510E       ver = 5
141D  5110       for symnum = startnbr to endnbr
142A  5112   '
142A  5112           gosub 14000 ' get symbol
142F  5112   '
142F  5112           if symnum < 100 then locate ver, hor + 3 else locate ver, ho
               r + 2
1460  5112           print symnum;
1469  5112           dispx = 8 * hor + 32 - chrw/2 - 1
1492  5114           dispy = 8 * ver + 24 - chrh/2 - 1
14BB  5116           call overlay (dispx, dispy, storage, soff)
14D4  5116           hor = hor + 8
14DE  5116           if hor > 33 then hor = 1: ver = ver + 7
14FA  5116   '
14FA  5116       next symnum
150E  5116   '
150E  5116   return
1511  5116   '
1511  5116   300 '
1512  5116   '
1512  5116   '   This will be the end function.
1512  5116   '
1512  5116       gosub 32000
1517  5116       return
151A  5116   '
151A  5116   400 '
151B  5116   '
151B  5116   '   draw/erase
151B  5116   '
151B  5116       call overlay (x, y, storage, soff)
1534  5116   '
1534  5116   '   Set up for the box for erasure or old character if draw
1534  5116   '
1534  5116       if stateflag = 4 then soff = smalloff: chrh = 3: chrw = 30
               : colorflg = 1: ymax = 176
1562  5116       if stateflag = 2 then soff = boxoff: chrh = 12: chrw = 9
1582  5116       if stateflag = 1 or stateflag = 3 then soff = oldoff: chrh
               = ochrh: chrw = ochrw: ymax = 199: colorflg = 0
15C5  5116   '
15C5  5116       x = 160 - chrw / 2
15DC  5116       y = 88 - chrh / 2
15F3  5116   '
15F3  5116       call overlay (x, y, storage, soff)     ' reset the cursor
160C  5116       gosub 9                                ' clear the extra graphics w/o LF
1611  5116   '
1611  5116       gosub 502     ' Prompt user with state
1616  5116   '
1616  5116       return
1619  5116   '
1619  5116   502 '
161A  5116   '
161A  5116   '   Prompt user with current state.
```

```
161A  5116        '
161A  5116            locate 23,1
1627  5116        '
1627  5116            print string$(39," ");
1635  5116        '
1635  5116            locate 23,1
1642  5116        '
1642  5116            if stateflag = 1 then print "Position symbol and press RED to place";
1655  5116        '
1655  5116            if stateflag = 2 then print "Position the box and press RED to erase";
1668  5116        '
1668  5116            if stateflag = 3 then print "Position symbol and press RED to Xor";
167B  5116        '
167B  5116            if stateflag = 4 then print "Point to upper left of picture and RED";
168E  5116        '
168E  5116            if stateflag = 5 then print "Enclose picture and press RED";
16A1  5116        '
16A1  5116            if stateflag = 6 then print "Center the value area and press RED";
16B4  5116        '
16B4  5116            if stateflag = 7 then print "Position the text and press RED";
16C7  5116        '
16C7  5116            if stateflag = 8 then print "Expand the box to the right and down";
16DA  5116        '
16DA  5116            if stateflag = 13 then print "Point to center of the circle & RED";
16ED  5116        '
16ED  5116            if stateflag = 14 then print "Red = expand, F9 = chg col, F10 = Halt";
1700  5116        '
1700  5116            if stateflag = 16 then print "Point to the first corner then RED";
1713  5116        '
1713  5116            if stateflag = 17 then print "Point to the opposite corner then RED";
1726  5116        '
1726  5116            if stateflag = 20 then print "Point to the start and press RED";
1739  5116        '
1739  5116            if stateflag = 21 then print "Point to the end and press RED";
174C  5116        '
174C  5116            gosub 1        ' display prompts
1751  5116            entryflg = 0
1758  5116            selflag = 0
175F  5116            initflag = 0
1766  5116            return
1769  5116        '
1769  5116    700 '
176A  5116        '
```

```
176A  5116    '   reset the screen
176A  5116    '
176A  5116        cls
176E  5116        call overlay(x, y, storage, soff)
1787  5116    '
1787  5116    '   set default to be place
1787  5116    '
1787  5116        stateflag = 1
178E  5116    '
178E  5116    '   Reset the associate DDT file.
178E  5116    '
178E  5116        ddtrecno = 0
1795  5116    '
1795  5116        gosub 14800
179A  5116        gosub 502
179F  5116    '
179F  5116        return
17A2  5116    '
17A2  5116    800 '
17A3  5116    '
17A3  5116    '   This will be the change cursor character color routine
17A3  5116    '   Prompt for color to be changed
17A3  5116    '
17A3  5116        gosub 14800
17A8  5116    '
17A8  5116    810 '
17A9  5116    '
17A9  5116    '   Some entries into color donot need the cursor cleaned up
17A9  5116    '
17A9  5116        if stateflag < 10 then stateflag = 10: message$ = "Point t
              o color to change and press RED"
17C4  5116    '
17C4  5116        colorflg = 1
17CB  5116        gosub 29000 ' clean up prompt area
17D0  5116        xput = 0
17D7  5116        yput = 185
17DE  5116        for i = 0 to 3
17E4  5116            xput = i *.80 + 20
17F2  5116            if i = 0 then call place(xput, yput, storage, blueoff)
1816  5116            if i = 1 then call place(xput, yput, storage, greenoff)
183A  5116            if i = 2 then call place(xput, yput, storage, redoff)
185E  5116            if i = 3 then call place(xput, yput, storage, whiteoff)
1882  5116            call overlay(xput, yput, storage, boxoff)
189B  5116        next i
18AD  5116    '
18AD  5116        locate 23,1
18BA  5116        print message$
18C2  5116    '
18C2  5116        x = 1
18C9  5116        y = 188
18D0  5116        chrh = 5
18D7  5116        chrw = 5
18DE  5116        soff = smalloff
18E5  5116        call overlay(x, y, storage, soff)
18FE  5116    '
18FE  5116        return
1901  5116    '
```

```
1901  5116   801 '
1902  5116       '
1902  5116       '    get first color
1902  5116       '
1902  5116           original = int(abs(x - 1) / 80)
1921  5118           stateflag = 11
1928  5118           locate 23,1
1935  5118           print "Point to change to color and press RED";
193D  5118       '
193D  5118           return
1940  5118       '
1940  5118   802 '
1941  5118       '
1941  5118       '    get second color
1941  5118       '
1941  5118           newcol = int(abs(x - 1) / 80)
1960  511A          gosub 14800
1965  511A          call overlay(x, y, storage, soff)
197E  511A          gosub 803
1983  511A       '
1983  511A       '   set draw to be the default mode
1983  511A       '
1983  511A          stateflag = 1
198A  511A          gosub 502    ' check for draw, erase
198F  511A          colorflg = 0
1996  511A          return
1999  511A       '
1999  511A   803 '
199A  511A       '
199A  511A       '   Change color
199A  511A       '
199A  511A          origo = coloro(original)
19A8  511C          newo = coloro(newcol) / 2    ' offset into the new color mas
              k table.
19C0  511E       '
19C0  511E       '   Clean-up the old cursor
19C0  511E       '
19C0  511E          call overlay(x, y, storage,soff)
19D9  511E       '
19D9  511E          gosub 804 'change the bits in storage
19DE  511E       '
19DE  511E       '   Put up new cursor
19DE  511E       '
19DE  511E          call overlay(x, y, storage, soff)
19F7  511E       '
19F7  511E          return
19FA  511E       '
19FA  511E   804 '
19FB  511E       '
19FB  511E       '   Change color in storage and set switch1 = 1 to end
19FB  511E       '   the main loop.
19FB  511E       '
19FB  511E          def seg = storage    ' point to symbol table area
1A03  511E       '
1A03  511E          xvalch! = peek(soff) + 256 * peek(soff+1)
1A3C  5122          yvalch! = peek(soff+2) + 256 * peek(soff+3)
```

```
1A79  5126         xval ch! = xvalch! / 2
1AB6  5126   '
1AB6  5126   '  Get the number of bytes of date in the cursor
1AB6  5126   '
1AB6  5126         bytes = int(( xvalch! * 2.0 + 7.0 ) / 8.0 ) * yvalch!
1AA5  5128   '
1AA5  5128   '  add 4 to bytes to look past the x and y sizes
1AA5  5128   '  3 bytes to loops because of 0th element
1AA5  5128   '
1AA5  5128         init = soff + 4
1AB0  512A         loops = bytes + soff + 3
1ABE  512C   '
1ABE  512C         for j = init to loops
1ACB  512E   '
1ACB  512E   '        a is my stepper through the masks
1ACB  512E   '
1ACB  512E            a = origo      ' initialize stepper to first offset in mask
1AD2  512E            cvalue = peek(j)
1AE5  5130   '
1AE5  5130   '        Step through the 4 bit pairs / byte
1AE5  5130   '
1AE5  5130            for i = 0 to 3
1AEB  5130   '
1AEB  5130                one = chcolor(a)       ' mask to identify change character
1AF9  5132                two = chcolor(a + 1)  'test mask
1B07  5134                three = 255 - one     ' cleanup mask for inserting character
1B12  5136                four = newcolor( newo + i)
1B24  5138   '
1B24  5138   '   I have half a mind not to document this, but......
1B24  5138   '   Compare the 2 bit value to the highest value it could have
1B24  5138   '
1B24  5138   '   If it equals the test mask then it is the correct color.
1B24  5138   '   Then Clean out the found bit values and or in the new
1B24  5138   '   mask.
1B24  5138   '
1B24  5138                if (cvalue and one) = two then cvalue = cvalue and three or four
1B44  5138   '
1B44  5138                a = a + 2      ' increment the stepper to the next two bit pair
1B4D  5138   '
1B4D  5138            next i
1B5C  5138   '
1B5C  5138            poke j,cvalue    ' replace the updated value
1B6C  5138   '
1B6C  5138         next j
1B80  5138   '
1B80  5138         def seg
1B84  5138   '
1B84  5138   '  End main loop by setting good switch
1B84  5138   '
1B84  5138         switch1 = 0
1B8B  5138         return
1B8E  5138   '
1B8E  5138    900 '
```

```
1B8F   5138         '  Associate a symbol with a process variable.
1B8F   5138         '
1B8F   5138         '
1B8F   5138         '
1B8F   5138         '  First clean-up the box!!!!
1B8F   5138         '  Save the box size
1B8F   5138         '
1B8F   5138            line (xfirst, yfirst) - (x, y), 0, b
1BAB   513C           put (xfirst,yfirst), boxsel, pset
1BBC   513C           sizex = x - xfirst + 1
1BCA   513E           sizey = y - yfirst + 1
1BD8   5140         '
1BD8   5140            if ddtrecno > 30 then locate 25,1: print "Variable file fu
               ll";: return
1BFB   5140            switch1 = 1
1C02   5140            while switch1
1C0E   5140               message$ = "Name of the variable: [         ]"
1C17   5140               inputcol = 25
1C1E   5140               gosub 29010
1C23   5140               input; "",var$
1C33   5144               a = len (var$): var$ = var$ + string$(8 - a, " ")
1C53   5144               gosub 901
1C58   5144               if nofilefl = 0 then gosub 906
1C68   5144               if nofilefl = 1 then gosub 903 else gosub 904
1C80   5144         '
1C80   5144            wend
1C84   5144         '
1C84   5144         '  Variable name was found then get pointing for value
1C84   5144         '  else return.
1C84   5144         '
1C84   5144            if nofilefl = 0 then chrh = ochrh: chrw = ochrw: soff = ol
               doff: x = 160 - chrh / 2: y = 88 - chrh / 2: call overlay(x, y,
               storage, soff)
1CEB   5144            if nofilefl = 0 then ymax = 199: stateflag = 1: gosub 502:
               colorflg = 0
1D10   5144            if nofilefl = 1 then soff = smalloff: call overlay(x, y, s
               torage, soff): gosub 502
1D40   5144            if nofilefl = 1 then chrh = 5: chrw = 20
1D59   5144         '
1D59   5144            return
1D5C   5144         '
1D5C   5144         901 '
1D5D   5144         '
1D5D   5144         '  Check for existence of variable name
1D5D   5144         '
1D5D   5144            nofilefl = 0
1D64   5144            on error goto 930
1D6B   5144            open "varfile.tab" as #2 len = 64
1D7E   5144            on error goto 31300
1D85   5144         '
1D85   5144         '  If no file then return
1D85   5144         '
1D85   5144            if nofilefl <> 0 then nofilefl = 0: return
1D9A   5144         '
1D9A   5144            field #2, 2 as typeup$, 8 as varup$, 2 as f$, 2 as entry$,
               50 as fill$
```

```
1DCB    5158    '
1DCB    5158            get #2, 1
1DD2    515B            num = cvi(typeup$)
1DDD    515A            for i = 2 to num + 1
1DEB    515C                get #2, i
1DF6    515C                if var$ = varup$ then goto 902
1E08    515C            next i
1E19    515C    '
1E19    515C            nofilefl = 0
1E20    515C    '
1E20    515C            close #2
1E27    515C            return
1E2A    515C    '
1E2A    515C    902 '
1E2B    515C    '
1E2B    515C    '       Variable was found, so set the flag.
1E2B    515C    '
1E2B    515C            entrynum = cvi(entry$)
1E36    515E            typeentry = 1
1E3D    5160            nofilefl = 1
1E44    5160            close #2
1E4B    5160    '
1E4B    5160            return
1E4E    5160    '
1E4E    5160    903 '
1E4F    5160    '
1E4F    5160    '       good variable name entered
1E4F    5160    '
1E4F    5160            ddtrecno = ddtrecno + 1
1E57    5160            entry(ddtrecno) = entrynum
1E66    5160            typeddt(ddtrecno) = typeentry
1E75    5160    '
1E75    5160            ulxchar(ddtrecno) = xfirst
1E84    5160            ulychar(ddtrecno) = yfirst
1E93    5160            boxsizex(ddtrecno) = sizex * 2
1EA4    5160            boxsizey(ddtrecno) = sizey
1EB3    5160    '
1EB3    5160    '       Alarm is a variable for future different alarms.
1EB3    5160    '
1EB3    5160            alarm(ddtrecno) = 1
1EC0    5160    '
1EC0    5160            switch1 = 0
1EC7    5160            stateflag = 6
1ECE    5160            return
1ED1    5160    '
1ED1    5160    904 '
1ED2    5160    '
1ED2    5160    '       This code handles invalid variable name
1ED2    5160    '
1ED2    5160            message$ = "Variable not found try again? Y/N [ ]"
1EDB    5160            inputcol = 36
1EE2    5160            gosub 29010 ' handle prompt
1EE7    5160            input;"",y$
1EF7    5160            if y$ <> "Y" and y$ <> "y" then switch1 = 0
1F21    5160    '
1F21    5160            return
1F24    5160    '
```

```
1F24   5160   906 '
1F25   5160       '
1F25   5160       '   Check screen file.
1F25   5160       '
1F25   5160           on error goto 940
1F2C   5160       '
1F2C   5160           open "scrfile.tab" as #2 len = 72
1F3F   5160       '
1F3F   5160           field #2, 2 as typeup$, 70 as entry$
1F55   5160           on error goto 31300
1F5C   5160       '
1F5C   5160       '   If no file then return
1F5C   5160       '
1F5C   5160           if nofilefl <> 0 then nofilefl = 0: return
1F71   5160           get #2, 1
1F7B   5160           num = cvi(typeup$)
1F86   5160           field #2, 2 as entry$, 8 as varup$, 62 as fill$
1FA4   5160       '
1FA4   5160           for i = 2 to num + 1
1FB2   5162               get #2, i
1FBD   5162               if var$ = varup$ then goto 908
1FCF   5162           next i
1FE0   5162       '
1FE0   5162           nofilefl = 0
1FE7   5162       '
1FE7   5162           close #2
1FEE   5162       '
1FEE   5162           return
1FF1   5162       '
1FF1   5162   908 '
1FF2   5162       '
1FF2   5162       '   Screen was found, so set the flag.
1FF2   5162       '
1FF2   5162           entrynum = cvi(entry$)
1FFD   5162           typeentry = 2
2004   5162           nofilefl = 1
200B   5162           close #2
2012   5162       '
2012   5162           return
2015   5162       '
2015   5162   910 '
2016   5162       '
2016   5162       '   This code will store away the value location.
2016   5162       '
2016   5162           xput = x
201D   5162           yput = y - 3
2027   5162           if xput < 0 then xput = 0
2039   5162           if yput < 0 then yput = 0
204B   5162       '
204B   5162           ulxvalue(ddtrecno) = xput
205A   5162           ulyvalue(ddtrecno) = yput
2069   5162       '
2069   5162       '   Clean-up the dot
2069   5162       '
2069   5162           call overlay(x, y, storage, soff)
2082   5162           chrh = ochrh
```

```
2089  5162        chrw = ochrw
2090  5162        x = 160 - chrh / 2
20A7  5162        y = 88 - chrw / 2
20BE  5162        colorflg = 0
20C5  5162        soff = oldoff
20CC  5162        ymax = 199
20D3  5162    '
20D3  5162    '   Put the cursor back up.
20D3  5162    '
20D3  5162        call overlay(x, y, storage, soff)
20EC  5162        stateflag = 1
20F3  5162        gosub 502
20F8  5162    '
20FB  5162        return
20FB  5162    '
20FB  5162   930 '
20FC  5162    '
20FC  5162    '   No variable table found
20FC  5162    '
20FC  5162        gosub 29000
2101  5162        close #2
2108  5162        locate 23,1
2115  5162        print "Variable table file was not found.";
211D  5162        locate 25,1
212A  5162        print "Run <Variable Table Generator>";
2132  5162    '
2132  5162        nofilefl = 1
2139  5162        for i = 0 to 1000: j = 0: next i
2156  5162    '
2156  5162        resume next
215A  5162    '
215A  5162   940 '
215B  5162    '
215B  5162    '   No Screen table found
215B  5162    '
215B  5162        gosub 29000
2160  5162        close #2
2167  5162        locate 23,1
2174  5162        print "Alarm / Action table file was not found";
217C  5162        locate 25,1
2189  5162        print "Run <Alarm / Action Definition>";
2191  5162    '
2191  5162        nofilefl = 1
2198  5162        for i = 0 to 1000: j = 0: next i
21B5  5162    '
21B5  5162        resume next
21B9  5162    '
21B9  5162   950 '
21BA  5162    '
21BA  5162    '   Text to the screen in small format
21BA  5162    '
21BA  5162        gosub 14800 ' clean up the arrow
21BF  5162    '
21BF  5162        oldoff = soff
21C6  5162    '
21C6  5162        gosub 29000 ' clear prompt area
21CB  5162        switch1 = 1
```

```
21D2   5162           a = 1
21D9   5164           textchrw = 0
21E0   5166           locate 23,1
21ED   5166           print "Enter alphanumerics, then  ---'";
21F5   5166           locate 24,1
2202   5166           print "["; string$(37," "); "]";
221A   5166           while switch1
2226   5166               tkey2 = 0
222D   5168               key2 = 0
2234   5168   953       k$ = inkey$
223D   5168           if k$ = "" then 953
2248   5168           if len(k$) > 1 then key2 = 0
225D   5168           if asc(k$) = 8 then key2 = -8
2272   5168           if asc(k$) = 32 then key2 = 40
2287   5168           if asc(k$) < 123 and asc(k$) > 96 then tkey2 = asc(k$) : key2 = asc(k$) - 86
22C5   5168           if asc(k$) < 91 and asc(k$) > 64 then tkey2 = asc(k$) : key2 = asc(k$) - 54
2303   5168           if asc(k$) < 58 and asc(k$) > 47 then tkey2 = asc(k$) : key2 = asc(k$) - 47
2341   5168           if asc(k$) = 13 then switch1 = 0: goto 952
235A   5168           locate 25,1
2367   5168           print string$(39," ");
2375   5168           if key2 = 0 then locate 25,1: print "Please use letters or numbers only"; : goto 952
2399   5168   '
2399   5168   '
2399   5168           if key2 = 40 then a = a + 1
23AC   5168           if key2 = -8 then if a > 1 then a = a - 1: key2 = 40
23D1   5168           xi = a * 5
23DC   516A           yi = 186
23E3   516C           soff = smalloff + key2 * 14
23F2   516C           if a <> 0 then call place(xi, yi, storage, soff)
2416   516C           if tkey2 > 0 then a = a + 1
2429   516C           if a > 59 then switch1 = 0
243B   516C   '
243B   516C   '       Branch around for error
243B   516C   '
243B   516C   952 '
243C   516C   '
243C   516C           wend
2440   516C   '
2440   516C   '       Clean up the cursor
2440   516C   '
2440   516C           soff = oldoff
2447   516C           call overlay(x, y, storage, soff)
2460   516C   '
2460   516C
2460   516C   '
2460   516C   '       Make the text the current character
2460   516C   '
2460   516C           xi = xi + 5
246A   516C           get (5,185) - (xi, 191), boxsel
2487   516C   '
2487   516C   '       Put up the new cursor
2487   516C   '
2487   516C           x = 0
```

```
248E    516C    955     put (x,y),boxsel, xor
24A3    516C    '
24A3    516C    '       Put in the chrh and width
24A3    516C    '
24A3    516C            chrw = xi - 5
24AD    516C            chrh = 6
24B4    516C            ymax = 176
24BB    516C            colorflg = 1
24C2.   516C    '
24C2    516C            stateflag = 7
24C9    516C    '
24C9    516C            gosub 502
24CE    516C    '
24CE    516C            return
24D1    516C    '
24D1    516C    960 '
24D2    516C    '
24D2    516C    '       Clean-up text
24D2    516C    '
24D2    516C            ymax = 199
24D9    516C            colorflg = 0
24E0    516C            put (x, y), boxsel, xor
24F5    516C    '
24F5    516C            chrh = ochrh
24FC    516C            chrw = ochrw
2503    516C            x = 160 - chrw / 2
251A    516C            y = 88 - chrh / 2
2531    516C            call overlay(x, y, storage, soff)
254A    516C    '
254A    516C            stateflag = 1
2551    516C    '
2551    516C            gosub 502
2556    516C    '
2556    516C            return
2559    516C    '
2559    516C    1000 '
255A    516C    '
255A    516C    '       Switch selector to allow different functions to be invoked
255A    516C    '
255A    516C            if stateflag = 1 then gosub 20: goto 1001
256E    516C    '
256E    516C            if stateflag = 2 then gosub 30: goto 1001
2582    516C    '
2582    516C            if stateflag = 3 then gosub 40: goto 1001
2596    516C    '
2596    516C            if stateflag = 4 then gosub 3000: goto 1001
25AA    516C    '
25AA    516C            if stateflag = 5 or stateflag = 8 then gosub 900: goto 1001
25D3    516C    '
25D3    516C            if stateflag = 6 then gosub 910: goto 1001
25E7    516C    '
25E7    516C            if stateflag = 7 then gosub 42 : gosub 960: goto 1001
2600    516C    '
2600    516C            if stateflag = 10 then gosub 801: goto 1001
2614    516C    '
```

```
2614  516C         if stateflag = 11 then gosub 802: goto 1001
2628  516C       '
2628  516C         if stateflag = 12 then gosub 1121: goto 1001
263C  516C       '
263C  516C         if stateflag = 13 then gosub 1910: goto 1001
2650  516C       '
2650  516C         if stateflag = 15 then gosub 1950: goto 1001
2664  516C       '
2664  516C         if stateflag = 16 then gosub 2010: goto 1001
2678  516C       '
2678  516C         if stateflag = 17 then gosub 2020: goto 1001
268C  516C       '
268C  516C         if stateflag = 18 then gosub 2030: goto 1001
26A0  516C       '
26A0  516C         if stateflag = 20 then gosub 1110: goto 1001
26B4  516C       '
26B4  516C         if stateflag = 21 then gosub 1120: goto 1001
26C8  516C       '
26C8  516C       ' if stateflag = 22 then gosub 3000: goto 1001
26C8  516C         gosub 55
26CD  516C       '
26CD  516C  1001 '
26CE  516C       '
26CE  516C         return
26D1  516C       '
26D1  516C  1100 '
26D2  516C       '
26D2  516C       ' Draw a line between two pointings
26D2  516C       '
26D2  516C         stateflag = 20
26D9  516C         gosub 14800
26DE  516C         if firstx = 0 then firstx = x: firsty = y
26F7  5170         call overlay(x, y, storage, soff)
2710  5170       '
2710  5170         soff = smalloff
2717  5170         chrh = 3: chrw = 3: ymax = 176: colorflg = 1
2733  5170         x = firstx
273A  5170         y = firsty
2741  5170         call overlay(x, y, storage, soff)
275A  5170       '
275A  5170         gosub 502
275F  5170       '
275F  5170         return
2762  5170       '
2762  5170  1110 '
2763  5170       '
2763  5170       ' First pointing for the line
2763  5170       '
2763  5170         stateflag = 21
276A  5170         firstx = x + 2
2773  5170         firsty = y + 1
277B  5170         gosub 502
2780  5170       '
2780  5170         return
2783  5170       '
2783  5170  1120 '
2784  5170       '
```

```
2784  5170        '  Second point for a line
2784  5170        '
2784  5170           secondx = x + 2
278D  5172           secondy = y + 1
2795  5174           message$ = "Choose a color and press RED"
279E  5174           stateflag = 12
27A5  5174           ymax = 199
27AC  5174           colorflg = 0
27B3  5174        '
27B3  5174           gosub 800
27B8  5174        '
27B8  5174           return
27BB  5174        '
27BB  5174  1121 '
27BC  5174        '
27BC  5174        '  get the color and draw the line
27BC  5174        '
27BC  5174           number = int(abs(x - 1) / 80)
27DB  5176        '
27DB  5176           gosub 14800
27E0  5176        '
27E0  5176           line (firstx, firsty) - (secondx, secondy), number
27FB  5176        '
27FB  5176        '  Keep the last line pointings.
27FB  5176        '
27FB  5176           firstx = secondx - 1
2803  5176           firsty = secondy - 1
280B  5176        '
280B  5176           stateflag = 1
2812  5176           colorflg = 0
2819  5176        '
2819  5176           call overlay(x, y, storage, soff)
2832  5176        '
2832  5176           gosub 502
2837  5176        '
2837  5176           return
283A  5176        '
283A  5176  1700 '
283B  5176        '
283B  5176        '  Load an existing screen
283B  5176        '
283B  5176           nofilefl = 0
2842  5176           inputcol = 22
2849  5176           message$ = "Enter screen name: [            ]"
2852  5176           gosub 29010
2857  5176           input; "", file$
2867  5176           file$ = file$ + ".scr"
2873  5176           gosub 1710
2878  5176           on error goto 31300
287F  5176        '
287F  5176        '  Error on opening the screen file.
287F  5176        '
287F  5176           if nofilefl <> 0 then: gosub 502: return
2892  5176           call overlay(x, y, storage, soff)
28AB  5176           def seg = &hb800
28B2  5176           bload file$,0
28BB  5176           soff = oldoff
```

```
28C2  5176        chrh = ochrh
28C9  5176        chrw = ochrw
28D0  5176        call overlay(x, y, storage, soff)
28E9  5176        gosub 502
28EE  5176   '
28EE  5176   '    return
28F1  5176   '
28F1  5176   1710 '
28F2  5176   '
28F2  5176   '    Check for existence of the screen
28F2  5176   '
28F2  5176        on error goto 1711
28F9  5176        open file$ for input as #3
290A  5176        close #3
2911  5176        return
2914  5176   '
2914  5176   1711 '
2915  5176   '
2915  5176   '    No file found
2915  5176   '
2915  5176        gosub 29000
291A  5176        locate 23,1
2927  5176        print "File "; file$; " was not found.";
2939  5176        for i = 0 to 10000: j = 0: next i
2956  5176   '
2956  5176        nofilefl = 1
295D  5176   '
295D  5176        resume next
2961  5176   '
2961  5176   1800 '
2962  5176   '
2962  5176   '    File the dynamic display table away on disk
2962  5176   '
2962  5176        gosub 14800 ' reset the cursor
2967  5176        gosub 29000 ' clear prompt area
296C  5176        if ddtrecno = 0 then gosub 1850: return
297F  5176        call overlay(x, y, storage, soff) ' clean up the cursor
2998  5176        switch1 = 1
299F  5176        while switch1
29AB  5176            message$ = "Please enter the display name[       ]"
29B4  5176            inputcol = 31
29BB  5176            gosub 29010
29C0  5176            input; "",file$
29D0  5176            if file$ <> "" then gosub 1810
29E3  5176   '
29E3  5176        wend
29E7  5176   '
29E7  5176        call overlay(x, y, storage, soff) ' put up the old cursor
2A00  5176   '
2A00  5176        stateflag = 1
2A07  5176        gosub 502
2A0C  5176   '
2A0C  5176        return
2A0F  5176   '
2A0F  5176   1810 '
2A10  5176   '
2A10  5176   '    File the ddt and the screen
```

```
2A10  5176    '
2A10  5176          switch1 = 0
2A17  5176          nofilefl = 0
2A1E  5176    '
2A1E  5176    '     GET the description info. for the display directory
2A1E  5176    '
2A1E  5176          gosub 1815
2A23  5176    '
2A23  5176          gosub 29000 ' clear the prompt area
2A28  5176.         locate 23,1
2A35  5176          print "Please check storage medium";
2A3D  5176    '
2A3D  5176          locate 25,1
2A4A  5176          print "Then press any key.";
2A52  5176    1811 if inkey$ = "" then 1811
2A5E  5176    '
2A5E  5176          ddt$ = "test"
2A67  517A          on error goto 1820
2A6E  517A          open ddt$ for output as #3
2A80  517A          on error goto 31300
2AB7  517A          close #3
2A8E  517A          if nofilefl > 0 then return
2A9C  517A          KILL DDT$
2AA3  517A          if nofilefl > 0 then return
2AB1  517A    '
2AB1  517A          ddt$ = FILE$ + ".DDT"
2ABF  517A          open ddt$ as #3 len = 20
2AD2  517A          if nofilefl > 0 then return
2AE0  517A          field #3, 2 as entry$, 2 as ulxchar$, 2 as ulychar$, 2 as
              boxx$, 2 as boxy$, 2 as alarm$, 2 as ulxvalue$, 2 as ulyvalue$,
              2 as typddt$, 2 as fill$
2B36  519A    '
2B36  519A    '     Put up the number of records in a header rec.
2B36  519A    '
2B36  519A          lset entry$ = mki$(ddtrecno)
2B43  519A    '
2B43  519A          put #3, 1
2B4D  519A          if nofilefl > 0 then return
2B5B  519A    '
2B5B  519A          for i = 1 to ddtrecno
2B68  519C              lset entry$ = mki$(entry(i))
2B7B  519C              lset typddt$ = mki$(typeddt(i))
2B8E  519C              lset ulxchar$ = mki$(ulxchar(i))
2BA1  519C              lset ulychar$ = mki$(ulychar(i))
2BB4  519C              lset boxx$ = mki$(boxsizex(i))
2BC7  519C              lset boxy$ = mki$(boxsizey(i))
2BDA  519C              lset alarm$ = mki$(alarm(i))
2BED  519C              lset ulxvalue$ = mki$(ulxvalue(i))
2C00  519C              lset ulyvalue$ = mki$(ulyvalue(i))
2C13  519C    '
2C13  519C              j = i + 1
2C1B  519C              put #3, j
2C26  519C              if nofilefl > 0 then return
2C34  519C    '
2C34  519C          next i
2C48  519C    '
2C48  519C          close #3
```

```
2C4F   519C        if nofilefl > 0 then return
2C5D   519C      '
2C5D   519C      ' Save the display description table away
2C5D   519C      '
2C5D   519C        ddt$ = "display.tab"
2C66   519C        open ddt$ as #3 len = 80
2C79   519C        if nofilefl > 0 then return
2C87   519C        field #3, 8 as entryname$, 70 as entry$, 2 as fill$
2CA5   51A0        j = len(file$)
2CAF   51A0      '
2CAF   51A0        for k = 1 to 100
2CB6   51A0            get #3, k
2CC1   51A2            if file$ = left$(entryname$,j) then 1812
2CD7   51A2            if left$(entryname$,5) = "@#$Z!" then 1812
2CEC   51A2        next
2CFB   51A2      '
2CFB   51A2        gosub 29000
2D00   51A2        locate 23,1
2D0D   51A2        print "Display table is full";
2D15   51A2        for i = 0 to 9999: j = 1: next
2D32   51A2      '
2D32   51A2        return
2D35   51A2      '
2D35   51A2   1812 '
2D36   51A2        lset entry$ = message$
2D3F   51A2        lset entryname$ = file$
2D48   51A2        put #3, k
2D53   51A2      '
2D53   51A2        close #3
2D5A   51A2      '
2D5A   51A2      ' Save the screen away
2D5A   51A2      '
2D5A   51A2        ddt$ = FILE$ + ".scr"
2D68   51A2        def seg = &hb800
2D6F   51A2      '
2D6F   51A2   1814 bsave ddt$, 0, &h4000
2D7B   51A2      '
2D7B   51A2      '
2D7B   51A2        return
2D7E   51A2      '
2D7E   51A2   1815 '
2D7F   51A2      '
2D7F   51A2      ' Get the description data for the display
2D7F   51A2      '
2D7F   51A2        gosub 29000
2D84   51A2        locate 23,1
2D91   51A2        print "Enter description on the next 2 lines."
2D99   51A2        i = 1
2DA0   51A2        j = 24
2DA7   51A2        flag = 0
2DAE   51A4        message$ = ""
2DB7   51A4        while j < 26
2DC2   51A4            while i < 39
2DCD   51A4                locate j,i
2DDC   51A4                charflag = 0
2DE3   51A6   1816     a$ = inkey$: if a$ = "" then 1816
```

| | | |
|---|---|---|
| 2DF7 | 51AA | `            if len(a$) < 2 then gosub 1817: if charflag = 0 then print a$;: i = i + 1: message$ = message$ + a$` |
| 2E31 | 51AA | `            if len(a$) > 1 then beep` |
| 2E43 | 51AA | `            if flag > 0 or (( i > 31 ) and ( j > 24 )) then j = 30: i = 99` |
| 2E7E | 51AA | `        wend` |
| 2E82 | 51AA | `        j = j + 1` |
| 2E8A | 51AA | `        i = 1` |
| 2E91 | 51AA | `    wend` |
| 2E95 | 51AA | `'` |
| 2E95 | 51AA | `    return` |
| 2E98 | 51AA | `'` |
| 2E98 | 51AA | `1817 '` |
| 2E99 | 51AA | `'` |
| 2E99 | 51AA | `'   Length of inkey = 1` |
| 2E99 | 51AA | `'` |
| 2E99 | 51AA | `    if asc(a$) = 13 then flag = 1: charflag = 1: return` |
| 2EB8 | 51AA | `    if asc(a$) = 8 and j = 24 and i = 1 then charflag = 1: beep: return` |
| 2EF6 | 51AA | `    if asc(a$) = 8 then if i = 1 then j = j - 1: i = 38 else i = i - 1` |
| 2F29 | 51AA | `    if asc(a$) = 8 then leng = len(message$) - 1: locate j,i: print " ";` |
| 2F59 | 51AC | `    if asc(a$) = 8 then message$ = left$(message$, leng): charflag = 1: return` |
| 2F82 | 51AC | `'` |
| 2F82 | 51AC | `    return` |
| 2F85 | 51AC | `'` |
| 2F85 | 51AC | `1820 '` |
| 2F86 | 51AC | `'` |
| 2F86 | 51AC | `'   Disk error` |
| 2F86 | 51AC | `'` |
| 2F86 | 51AC | `    nofilefl = 1` |
| 2FBD | 51AC | `    gosub 29000` |
| 2F92 | 51AC | `    locate 23,1` |
| 2F9F | 51AC | `    print "Disk error check disk drive B";` |
| 2FA7 | 51AC | `    for i = 0 to 10000: j = 0: next i` |
| 2FC4 | 51AC | `'` |
| 2FC4 | 51AC | `    resume next` |
| 2FC8 | 51AC | `'` |
| 2FC8 | 51AC | `1850 '` |
| 2FC9 | 51AC | `'` |
| 2FC9 | 51AC | `'   Check for save of the screen` |
| 2FC9 | 51AC | `'` |
| 2FC9 | 51AC | `    locate 23,1` |
| 2FD6 | 51AC | `    stateflag =1` |
| 2FDD | 51AC | `    print "Only the screen will be saved.";` |
| 2FE5 | 51AC | `    beep` |
| 2FE9 | 51AC | `    for i = 0 to 9999: j = 1: next` |
| 3006 | 51AC | `'` |
| 3006 | 51AC | `    message$ = "Name of the screen: [        ]"` |
| 300F | 51AC | `    inputcol = 23` |
| 3016 | 51AC | `    gosub 29010` |
| 301B | 51AC | `    input; "",file$` |
| 302B | 51AC | `    if file$ = "" then return` |
| 303C | 51AC | `    file$ = file$ + ".scr"` |
| 3048 | 51AC | `    call overlay( x, y, storage, soff)` |

```
3061  51AC        def seg = &hb800
306B  51AC        bsave file$, 0, &h4000
3074  51AC        call overlay( x, y, storage, soff)
308D  51AC    '
308D  51AC        return
3090  51AC    '
3090  51AC    1900 '
3091  51AC    '
3091  51AC    '   circle
3091  51AC    '
3091  51AC    '   Keep the user above the 23rd line
3091  51AC    '
3091  51AC        ymax = 176
3098  51AC        colorflg = 1
309F  51AC        stateflag = 13 'prompt for a pointing
30A6  51AC    '
30A6  51AC        call overlay(x,y,storage,soff)
30BF  51AC    '
30BF  51AC        soff = smalloff
30C6  51AC        ochrh = chrh
30CD  51AC        ochrw = chrw
30D4  51AC        chrh = 3
30DB  51AC        chrw = 3
30E2  51AC        call overlay(x,y,storage,soff)
30FB  51AC    '
30FB  51AC        gosub 502
3100  51AC    '
3100  51AC        return
3103  51AC    '
3103  51AC    1910 '
3104  51AC    '
3104  51AC    '   more circle
3104  51AC    '
3104  51AC    '   Set up recovery routine for circle's off the screen
3104  51AC    '
3104  51AC        stateflag = 14
310B  51AC    '
310B  51AC        call overlay(x, y, storage, soff)
3124  51AC        gosub 502
3129  51AC        count = 3
3130  51AE        color1 = 2
3137  51B0        switch1 = 1
313E  51B0        x = x + 2
3147  51B0        y = y + 1
314F  51B0        if y + count > 176 then y = 176 - count
316A  51B0        circle (x, y), count, color1
317D  51B0        while switch1
3189  51B0    '
3189  51B0            key1 = 0
3190  51B2            k$ = inkey$
3199  51B2            if k$ <> "" then if len(k$) > 1 then key1 = asc(right$(k$,1)
              ) else key1 = asc(k$)
31D2  51B2            if key1 = 68 then switch1 = 0
31E4  51B2            if key1 = 67 then color1 = color1 + 1: if color1 > 3 then co
              lor1 = 1
3209  51B2            button = 0
3210  51B2            if key1 = 43 then button = 1
```

```
3222   51B2              circlex = x - count
3220   51B4              circley = y - count
323B   51B6              if circlex < 0 then circlex = 0
324A   51B6              IF CIRCLEY < 0 THEN CIRCLEY = 0
325C   51B6              x1 = x + count
3267   51B8              y1 = y + count
3272   51BA              IF X1 > 319 THEN x1 = 319
3285   51BA              if Y1 > 176 then y1 = 176
3298   51BA              get (circlex, circley) - (x1,y1), boxsel
32BB   51BA              put (circlex, circley), boxsel, xor
32CD   51BA              if button = 1 then count = count + 1
32E0   51BA              if count >= 30 then count = 30
32F2   51BA              if y + count > 176 then y = 176 - count
330D   51BA              circle (x, y), count, color1
3320   51BA         '
3320   51BA              wend
3324   51BA         '
3324   51BA              button = 0
332B   51BA         '
332B   51BA              message$ = "Point to the color to fill the circle"
3334   51BA              stateflag = 15
333B   51BA              circlex = x + 1
3343   51BA              circley = y + 1
334B   51BA              IF CIRCLEX > 319 THEN CIRCLEX = 319
335E   51BA              if CIRCLEY > 176 then circley = 176
3371   51BA         '
3371   51BA              gosub 502
3376   51BA              ymax = 199
337D   51BA              gosub 810
3382   51BA         '
3382   51BA              return
3385   51BA         '
3385   51BA     1950 '
3386   51BA         '
3386   51BA         '    put up the circle and fill it appropriately
3386   51BA         '
3386   51BA              newcol = int(abs(x - 1) / 80)
33A5   51BA         '
33A5   51BA     1951     paint (circlex, circley), newcol, color1
33B8   51BA         '
33B8   51BA              colorflg = 0
33BF   51BA              stateflag = 1
33C6   51BA              gosub 14800
33CB   51BA         '
33CB   51BA              gosub 502
33D0   51BA         '
33D0   51BA              return
33D3   51BA         '
33D3   51BA     2000 '
33D4   51BA         '
33D4   51BA         '    Draw a box
33D4   51BA         '
33D4   51BA              colorflg = 1
33DB   51BA              ymax = 176
33E2   51BA              call overlay(x, y, storage, soff)
33FB   51BA              soff = smalloff
3402   51BA              ochrh = chrh
```

```
3409   51BA        ochrw = chrw
3410   51BA        chrw = 3
3417   51BA        chrh = 3
341E   51BA        stateflag = 16
3425   51BA        gosub 502
342A   51BA        call overlay(x, y, storage, soff)
3443   51BA        '
3443   51BA        return
3446   51BA        '
3446   51BA   2010 '
3447   51BA        '
3447   51BA        ' more box
3447   51BA        '
3447   51BA        stateflag = 17
344E   51BA        fx = x + 2
3457   51BC        fy = y + 1
345F   51BE        gosub 502
3464   51BE        '
3464   51BE        return
3467   51BE        '
3467   51BE   2020 '
3468   51BE        '
3468   51BE        ' more box
3468   51BE        '
3468   51BE        sx = x + 2
3471   51C0        sy = y + 1
3479   51C2        '
3479   51C2        call overlay(x, y, storage, soff)
3492   51C2        '
3492   51C2        stateflag = 18
3499   51C2        ymax = 199
34A0   51C2        message$ = "Point to the color to fill the box with"
34A9   51C2        gosub 810
34AE   51C2        '
34AE   51C2        return
34B1   51C2        '
34B1   51C2   2030 '
34B2   51C2        '
34B2   51C2        ' more box
34B2   51C2        '
34B2   51C2        stateflag = 1
34B9   51C2        '
34B9   51C2        newcol = int(abs(x - 1) / 80)
34D8   51C2        '
34D8   51C2        line (fx,fy) - (sx,sy), newcol, BF
34F3   51C2        '
34F3   51C2        colorflg = 0
34FA   51C2        gosub 14800
34FF   51C2        gosub 502
3504   51C2        '
3504   51C2        return
3507   51C2        '
3507   51C2   3000 '
3508   51C2        '
3508   51C2        ' Save the first point for the alarm display.
3508   51C2        '
3508   51C2        xfirst = x + 1
```

```
3510   51C2        yfirst = y + 1
3518   51C2        call overlay(x, y, storage, soff)
3531   51C2        x = x + 2
353A   51C2        y = y + 1
3542   51C2        for i = 1 to 1000
3549   51C2            j = 0
3550   51C2        next
3560   51C2    '
3560   51C2    '   get the picture area for storage and draw the enclosed area box
3560   51C2    '
3560   51C2        get (xfirst,yfirst) - (x + 20,y + 20), boxsel
3586   51C2        stateflag = 5
358D   51C2        colorflag = 1
3594   51C4        ymax = 176
359B   51C4        chrw = 1
35A2   51C4        gosub 502
35A7   51C4    '
35A7   51C4        return
35AA   51C4    '
35AA   51C4    3010 '
35AB   51C4    '
35AB   51C4    '   Draw the expanding box
35AB   51C4    '
35AB   51C4        if x - xfirst >= 0 and xold >= xfirst and yold >= yfirst then line (xfirst,yfirst) - (xold,yold), 0, b
35FA   51C4        if x - xfirst >= 0 then put (xfirst,yfirst), boxsel, pset
361E   51C4    '
361E   51C4        if x - xfirst < 0 then beep: stateflag = 8: gosub 502: return
3641   51C4        if y - yfirst < 0 then beep: stateflag = 8: gosub 502: return
3664   51C4        if x - xfirst > 47 then x = xfirst + 47
367F   51C4        if y - yfirst > 40 then y = yfirst + 39
369A   51C4    '
369A   51C4        if stateflag = 8 then stateflag = 5: gosub 502
36B1   51C4    '
36B1   51C4        get (xfirst,yfirst) - (x,y), boxsel
36D1   51C4        line (xfirst, yfirst) - (x,y), 2, b
36EB   51C4
36EB   51C4    '
36EB   51C4        return
36EE   51C4    '
36EE   51C4    14000 '
36EF   51C4    '
36EF   51C4    '   Get pointer from symbol table and initialize chrh & chrw
36EF   51C4    '   Pass:  symnum = symbol table number
36EF   51C4    '
36EF   51C4        symbnum = ( symnum + 1) * 2 + symbtoff
3700   51C6    '
3700   51C6        def seg = storage
370B   51C6        soff = peek(symbnum) + 256 * peek(symbnum + 1)
373E   51C6        soff = soff + offset2 + symbtoff
374D   51C6        oldoff = soff
3754   51C6    '
3754   51C6    '   set up new offset to symbol table proper
3754   51C6    '
```

```
3754   51C6   '     Get new symbol's height and width
3754   51C6   '
3754   51C6             chrw = peek(soff) + 256 * peek(soff + 1)
378A   51C6             chrh = peek(soff+2) + 256 * peek(soff + 3)
37C4   51C6             chrw = chrw / 2
37D6   51C6             def seg
37DA   51C6   '
37DA   51C6         return
37DD   51C6   '
37DD   51C6   14800 '
37DE   51C6   '
37DE   51C6   '     clean-up DEGREES cursor
37DE   51C6   '
37DE   51C6   '
37DE   51C6         call overlay(x, y, storage, soff)
37F7   51C6   '
37F7   51C6   '     Put up the old cursor.
37F7   51C6   '
37F7   51C6         chrh = ochrh
37FE   51C6         chrw = ochrw
3805   51C6         soff = oldoff
380C   51C6   '
380C   51C6         x = 160 - chrw / 2
3823   51C6         y = 88 - chrh / 2
383A   51C6   '
383A   51C6         call overlay(x, y, storage, soff)
3853   51C6   '
3853   51C6         return
3856   51C6   '
3856   51C6   14999 '
3857   51C6   '
3857   51C6   '     Data statements (initially only for change cursor)
3857   51C6   '
3857   51C6   '     Newcolor bit masks
3857   51C6   '
3857   51C6   data 0, 0, 0, 0, 64, 16, 4, 1, 128, 32, 8, 2, 192, 48, 12, 3
3859   51C6   '
3859   51C6   '     Original color to be changed bit masks
3859   51C6   '
3859   51C6   '     Blue:
3859   51C6   '
3859   51C6   data 192, 0, 48, 0, 12, 0, 3, 0
385B   51C6   '
385B   51C6   '     Green:
385B   51C6   '
385B   51C6   data 192, 64, 48, 16, 12, 4, 3, 1
385D   51C6   '
385D   51C6   '     Red:
385D   51C6   '
385D   51C6   data 192, 128, 48, 32, 12, 8, 3, 2
385F   51C6   '
385F   51C6   '     White:
385F   51C6   '
385F   51C6   data 192, 192, 48, 48, 12, 12, 3, 3
3861   51C6   '
3861   51C6   15000 '
3862   51C6   '
```

```
3862    51C6        ' This code enables a program to switch to the color monitor
3862    51C6        '
3862    51C6            def seg = 0
386B    51C6            a = peek(&h410)
387A    51C6            width 80
3881    51C6            poke &h410, (a and &hcf) or &h20
3899    51C6            width 40
38A0    51C6            screen 1
38A7    51C6            screen 0
38AD    51C6            locate ,,1,6,7
38C6    51C6            screen 1
38CD    51C6            color 16, 0
38D9    51C6            cls
38DD    51C6            key off
38E3    51C6            def seg
38E7    51C6        '
38E7    51C6            return
38EA    51C6        '
38EA    51C6    15900 '
38EB    51C6        '
38EB    51C6        ' Rotate the current character
38EB    51C6        '
38EB    51C6            call overlay(x, y, storage, soff)
3904    51C6            def seg = &hb800
390B    51C6            bsave "screen.scr",0,&h4000
3917    51C6            def seg
391B    51C6            cls
391F    51C6        '
391F    51C6            locate 23,1
392C    51C6            print "Please enter angle to rotate: [    ]";
3934    51C6            locate 23,32
3941    51C6            input ;"",a$
3951    51C6        '
3951    51C6            a = val(a$)
395E    51C6            c! = a / 57.29578
396F    51CA            s! = c!
3978    51CE            c! = cos(c!)
3983    51CE            s! = sin(s!)
398E    51CE        '
398E    51CE            i = 100
3995    51CE            j = 100
399C    51CE            call place(i, j, storage, soff)
39B5    51CE        '
39B5    51CE            k = 0
39BC    51CE            for i = 0 to chrw
39C8    51D0                for j = 0 to chrh
39D4    51D2                    colr(k) = point(100 + i, 100 + j)
39F0    51D2                    newx! = i * c! - j * s!
3A12    51D6                    newy! = i * s! + j * c!
3A34    51DA                    xnew(k) = int(newx!)
3A47    51DA                    ynew(k) = int(newy!)
3A5A    51DA        '
3A5A    51DA                    k = k + 1
3A62    51DA        '
3A62    51DA                next j
3A76    51DA        '
3A76    51DA            next i
```

```
3A8A   51DA         cls
3A8E   51DA      '
3A8E   51DA         k = 0
3A95   51DA         a = 320
3A9C   51DA         b = 200
3AA3   51DC         c = 0
3AAA   51DE         d = 0
3AB1   51DE      '
3AB1   51DE         for i = 0 to chrw
3ABD   51E0            for j = 0 to chrh
3AC9   51E2               t = xnew(k) + 100
3ADA   51E4               u = ynew(k) + 100
3AEB   51E6               if t < a then a = t
3AFF   51E6               if u < b then b = u
3B13   51E6               if t > c then c = t
3B27   51E6               if u > d then d = u
3B3B   51E6      '
3B3B   51E6               pset (t,u),colr(k)
3B51   51E6      '
3B51   51E6               k = k + 1
3B59   51E6      '
3B59   51E6            next j
3B6D   51E6      '
3B6D   51E6         next i
3B81   51E6      '
3B81   51E6         get (a,b) - (c,d), boxsel
3BA1   51E6         soff = newsymboff
3BAB   51E6         chrh = abs(d - b) + 1
3BBC   51E6         chrw = abs(c - a) + 1
3BD0   51E6      '
3BD0   51E6      '  Put character out.
3BD0   51E6      '
3BD0   51E6         i! = chrw
3BDC   51EA         j! = chrh
3BEB   51EE         i  = 4! + int(( i! * 2! + 7! ) / 8! ) * j!
3C0C   51EE      '
3C0C   51EE         def seg
3C10   51EE         a = varptr(boxsel(0))
3C17   51EE      '
3C17   51EE         for k = 0 to i
3C23   51F0      '
3C23   51F0            j = a + k
3C2E   51F0            j = peek( j )
3C41   51F0            l = newsymboff + k
3C4C   51F2            def seg = storage
3C54   51F2            poke l, j
3C64   51F2            def seg
3C68   51F2      '
3C68   51F2         next k
3C79   51F2      '
3C79   51F2         def seg = &hb800
3C80   51F2         bload "screen.scr",0
3C89   51F2         def seg
3CBD   51F2      '
3CBD   51F2         call overlay (x, y, storage, soff)
3CA6   51F2      '
3CA6   51F2         return
3CA9   51F2      '
3CA9   51F2   16000 '
```

```
3CAA    51F2    '
3CAA    51F2    '   Generate symbol
3CAA    51F2    '
3CAA    51F2        call overlay(x, y, storage, soff)
3CC3    51F2    '
3CC3    51F2        def seg = &hb800
3CCA    51F2        bsave "screen.scr",0,&h4000
3CD6    51F2        def seg
3CDA    51F2    '
3CDA    51F2        c1 = 1
3CE1    51F4    '
3CE1    51F4        get (0,0)-(3,3),box0
3CFA    51F4    '
3CFA    51F4        line (0,0)-(3,3),1,bf
3D0D    51F4        get (0,0)-(3,3),box1
3D26    51F4    '
3D26    51F4        line (0,0)-(3,3),2,bf
3D39    51F4        get (0,0)-(3,3),box2
3D52    51F4    '
3D52    51F4        line (0,0)-(3,3),3,bf
3D65    51F4        get (0,0)-(3,3),box3
3D7E    51F4    '
3D7E    51F4        line (0,0)-(3,3),0,bf
3D90    51F4    '
3D90    51F4        gosub 16010    ' Put up the screen
3D95    51F4        gosub 16020    ' Put up the mode
3D9A    51F4    '
3D9A    51F4        switch1 = 1
3DA1    51F4        while switch1
3DAD    51F4    '
3DAD    51F4            gosub 16030
3DB2    51F4    '
3DB2    51F4    16001 '
3DB3    51F4    '
3DB3    51F4            key1$ = inkey$
3DBC    51F8            if key1$ = "" then 16001
3DC7    51F8    '
3DC7    51F8            if len(key1$) > 1 then key1$ = right$(key1$,1)
3DE5    51F8            key1 = asc(key1$)
3DEF    51F8            if key1 > 58 and key1 < 69 then gosub 16040 ' function keys
3E14    51F8            if key1 > 70 and key1 < 82 then gosub 16050 ' cursor keys
3E39    51F8    '
3E39    51F8        wend
3E3D    51F8    '
3E3D    51F8        return
3E40    51F8    '
3E40    51F8    16010 '
3E41    51F8    '
3E41    51F8    '   Initialize the screen
3E41    51F8    '
3E41    51F8        def seg = &hb800
3E48    51F8        bload "create.scr",0
3E51    51F8        def seg
3E55    51F8    '
3E55    51F8    '   Draw the initial color box
3E55    51F8    '
3E55    51F8        line (233,11)-(238,21),c1,bf
3E6C    51F8    '
```

```
3E6C   51F8        return
3E6F   51F8    '
3E6F   51F8   16020 '
3E70   51F8    '
3E70   51F8    '   Switch modes from move to draw and vice-versa
3E70   51F8    '
3E70   51F8        locate 22,1
3E7D   51F8        print string$(6," ");
3E8B   51F8    '
3E8B   51F8        locate 22,1
3E98   51F8        if mode = 0 then mode = 1: print " MOVE "; else mode = 0: print " DRAW ";
3EC4   51FA    '
3EC4   51FA        return
3EC7   51FA    '
3EC7   51FA   16030 '
3EC8   51FA    '
3EC8   51FA    '   OVERLAY the box away
3EC8   51FA    '
3EC8   51FA        if c1 = 0 then put (xbox,ybox),box0,xor
3EE8   51FA        if c1 = 1 then put (xbox,ybox),box1,xor
3F08   51FA        if c1 = 2 then put (xbox,ybox),box2,xor
3F28   51FA        if c1 = 3 then put (xbox,ybox),box3,xor
3F48   51FA    '
3F48   51FA        return
3F4B   51FA    '
3F4B   51FA   16040 '
3F4C   51FA    '
3F4C   51FA    '   Function keys
3F4C   51FA    '
3F4C   51FA        key1 = key1 - 58
3F56   51FA    '
3F56   51FA    '                     F1   F2   F3   F4   F5   F6   F7   F8   F9   F10
3F56   51FA    '
3F56   51FA        on key1 gosub 16100, 16100, 16300, 16010, 16100, 16100, 16100, 16100, 16700, 16020
3F72   51FA    '
3F72   51FA        return
3F75   51FA    '
3F75   51FA   16050 '
3F76   51FA    '
3F76   51FA    '   Cursor keys
3F76   51FA    '
3F76   51FA        if key1 = 71 then if ybox <> yboxmin and xbox <> xboxmin then gosub 16052: ybox = ybox - 5: xbox = xbox - 5: goto 16051
3FC2   51FA        if key1 = 73 then if ybox <> yboxmin and xbox <> xboxmax then gosub 16052: ybox = ybox - 5: xbox = xbox + 5: goto 16051
400E   51FA        if key1 = 79 then if ybox <> yboxmax and xbox <> xboxmin then gosub 16052: ybox = ybox + 5: xbox = xbox - 5: goto 16051
405A   51FA        if key1 = 81 then if ybox <> yboxmax and xbox <> xboxmax then gosub 16052: ybox = ybox + 5: xbox = xbox + 5: goto 16051
40A6   51FA    '
40A6   51FA        if key1 = 72 then if ybox <> yboxmin then gosub 16052: ybox = ybox - 5: goto 16051
```

```
4001   51FA          if key1 = 75 then if xbox <> xboxmin then gosub 16052: xbo
                x = xbox - 5: goto 16051
40FC   51FA          if key1 = 77 then if xbox <> xboxmax then gosub 16052: xbo
                x = xbox + 5: goto 16051
4127   51FA          if key1 = 80 then if ybox <> yboxmax then gosub 16052: ybo
                x = ybox + 5: goto 16051
4152   51FA   '
4152   51FA   16051 '
4153   51FA   '
4153   51FA          return
4156   51FA   '
4156   51FA   16052 '
4157   51FA   '
4157   51FA   '   Put the box on the grid and the picture.
4157   51FA   '
4157   51FA          if mode = 1 then gosub 16030: return
416A   51FA          line (xbox,ybox)-(xbox+3,ybox+3),c1,bf
418B   51FA   '
418B   51FA          x1 = xreal + xbox / 5
41A9   51FA          y1 = yreal + ybox / 5
41C7   51FA          pset (x1,y1),c1
41D7   51FA   '
41D7   51FA          return
41DA   51FA   '
41DA   51FA   '
41DA   51FA   16100 '
41DB   51FA   '
41DB   51FA   '   F2 = quit
41DB   51FA   '
41DB   51FA          switch1 = 0
41E2   51FA          def seg = &hb800
41E9   51FA          bload "screen.scr",0
41F2   51FA          def seg
41F6   51FA   '
41F6   51FA          call overlay(x, y, storage, soff)
420F   51FA   '
420F   51FA          return
4212   51FA   '
4212   51FA   16300 '
4213   51FA   '
4213   51FA   '   Save symbol away
4213   51FA   '
4213   51FA          lastentry = numbsymb * 2 + symbtoff
4222   51FC          def seg = storage
422A   51FC          lastoff = peek(lastentry) + 256 * peek(lastentry + 1)
4260   51FE          lastoff = lastoff + offset2 + symbtoff
426F   51FE          x1 = peek(lastoff) + 256 * peek(lastoff + 1)
42A5   51FE          x1! = x1 / 2
42B6   5202          y1! = peek(lastoff + 2) + 256 * peek(lastoff + 3)
42F3   5206          def seg
42F7   5206          numbytes = 4! + int(( x1! * 2! + 7!) / 8!) * y1!
431B   5208          endshift = lastoff + numbytes + 2
4328   520A   '
4328   520A          x1 = xreal+39
4332   520A          y1 = yreal+29
433C   520A          get (xreal,yreal)-(x1,y1),boxsel
435C   520A   '
```

| | | | |
|---|---|---|---|
| 435C | 520A | ' | First get the first two bytes |
| 435C | 520A | ' | |
| 435C | 520A | | firstpic = lastentry + 2 |
| 4365 | 520C | ' | |
| 4365 | 520C | ' | Do the shifting |
| 4365 | 520C | ' | |
| 4365 | 520C | | def seg = storage |
| 436D | 520C | ' | |
| 436D | 520C | | oldchar1 = peek(firstpic) |
| 4380 | 520E | | oldchar2 = peek(firstpic + 1) |
| 4394 | 5210 | | j = firstpic + 2 |
| 439D | 5210 | ' | |
| 439D | 5210 | | for i = j to endshift step 2 |
| 43AA | 5212 | ' | |
| 43AA | 5212 | |     overlay1 = peek(i) |
| 43BD | 5214 | |     overlay2 = peek(i+1) |
| 43D1 | 5216 | ' | |
| 43D1 | 5216 | |     poke i, oldchar1 |
| 43E1 | 5216 | |     poke i + 1, oldchar2 |
| 43F2 | 5216 | ' | |
| 43F2 | 5216 | |     oldchar1 = overlay1 |
| 43F9 | 5216 | |     oldchar2 = overlay2 |
| 4400 | 5216 | ' | |
| 4400 | 5216 | | next i |
| 4412 | 5216 | ' | |
| 4412 | 5216 | ' | Poke in the new number of symbols |
| 4412 | 5216 | ' | |
| 4412 | 5216 | | def seg |
| 4416 | 5216 | | numbsymb = numbsymb + 1 |
| 441E | 5216 | | offset2 = numbsymb * 2 + 2 |
| 442B | 5216 | | a = varptr(numbsymb) |
| 4432 | 5216 | | i = peek(a) |
| 4445 | 5216 | | j = peek(a + 1) |
| 4459 | 5216 | | def seg = storage |
| 4461 | 5216 | | poke symbtoff, i |
| 4471 | 5216 | | poke symbtoff + 1, j |
| 4482 | 5216 | ' | |
| 4482 | 5216 | ' | Poke in the new last entry |
| 4482 | 5216 | ' | |
| 4482 | 5216 | | reallastoff = endshift - offset2 - symbtoff |
| 4493 | 5218 | | def seg |
| 4497 | 5218 | | a = varptr(reallastoff) |
| 449E | 5218 | | i = peek(a) |
| 44B1 | 5218 | | j = peek(a + 1) |
| 44C5 | 5218 | | def seg = storage |
| 44CD | 5218 | | poke firstpic, i |
| 44DD | 5218 | | poke firstpic + 1, j |
| 44EE | 5218 | ' | |
| 44EE | 5218 | ' | Poke in the symbol |
| 44EE | 5218 | ' | |
| 44EE | 5218 | | def seg |
| 44F2 | 5218 | | a = varptr(boxsel(0)) |
| 44F9 | 5218 | ' | |
| 44F9 | 5218 | | for k = 0 to 303 |
| 44FF | 5218 | ' | |
| 44FF | 5218 | |     j = a + k |
| 450A | 5218 | |     j = peek( j ) |

```
451D  5218              l = endshift + k
4528  5218              def seg = storage
4530  5218              poke l, j
4540  5218              def seg
4544  5218        '
4544  5218              next k
4554  5218        '
4554  5218        '     Update soff to point to the shifted buffer
4554  5218        '     if soff <> to the duck
4554  5218        '
4554  5218              if soff <> 20 then soff = soff + 2
4568  5218        '
4568  5218              return
456B  5218        '
456B  5218        16700 '
456C  5218        '
456C  5218        '     F9 - Change color
456C  5218        '
456C  5218              c1 = c1 + 1
4574  5218              if c1 = 4 then c1 = 0
4586  5218        '
4586  5218              line (233,11)-(238,21),c1,bf
459D  5218        '
459D  5218              return
45A0  5218        '
45A0  5218        '
45A0  5218        17000 '
45A1  5218        '
45A1  5218        '     Rotate through the symbol table
45A1  5218        '
45A1  5218              num$ = str$(rotatesym)
45AE  5218              gosub 232
45B3  5218              rotatesym = rotatesym + 1
45BB  5218              if rotatesym => numbsymb then rotatesym = 0
45CF  5218        '
45CF  5218              return
45D2  5218        '
45D2  5218        22000 '
45D3  5218        '
45D3  5218        '     This will get the profile settings for the joystick
45D3  5218        '
45D3  5218              def seg = storage
45DB  5218              xvar = peek(2) + 256 * peek(3)
460E  5218              yvar = peek(4) + 256 * peek(5)
4641  5218              if xvar = 0 then joystick = 0 else joystick = 1
465D  5218        '
465D  5218              def seg
4661  5218        '
4661  5218              return
4664  5218        '
4664  5218        29000 '
4665  5218        '
4665  5218        '     Clear the prompt area
4665  5218        '
4665  5218              locate 23,1
4672  5218              print string$(39," ");
4680  5218        '
```

```
46B0    5218        locate 24,1
46BD    5218        print string$(39," ");
469B    5218    '
469B    5218        locate 25,1
46A8    5218        print string$(39," ");
46B6    5218    '
46B6    5218        return
46B9    5218    '
46B9    5218    29010 '
46BA    5218    '
46BA    5218    '    Subroutine to handle prompts on line 23
46BA    5218    '
46BA    5218    '    Clear the prompt area
46BA    5218    '    prompt on line 23
46BA    5218    '    column = 1
46BA    5218    '    message$ = prompt
46BA    5218    '    inputcol = column number of the input
46BA    5218    '
46BA    5218        gosub 29000
46BF    5218    '
46BF    5218        locate 23,1
46CC    5218        print message$;
46D4    5218        locate 23, inputcol
46E2    5218    '
46E2    5218        return
46E5    5218    '
46E5    5218    30000 '
46E6    5218    '
46E6    5218    '    turn off all function keys
46E6    5218    '
46E6    5218        for i = 1 to 10
46ED    5218            key(i) off
46F5    5218        next i
4704    5218        for i = 1 to 10
470B    5218            key i,""
4716    5218        next i
4725    5218        return
4728    5218    '
4728    5218    31000 '
4729    5218    '
4729    5218    '    Quadrant 1 - 6 checker
4729    5218    '
4729    5218        if x < 50 then quadnew = 1
473B    5218        if x > 49 and x < 125 then quadnew = 2
4762    5218        if x > 124 and x < 173 then quadnew = 3
478A    5218        if x > 172 and x < 265 then quadnew = 4
47B3    5218        if x > 264 then quadnew = 5
47C6    5218    '
47C6    5218        gosub 31200
47CB    5218    '
47CB    5218        return
47CE    5218    '
47CE    5218    31100 '
47CF    5218    '
47CF    5218    '    Quadrant 7 - 11 checker
47CF    5218    '
47CF    5218        if x < 50 then quadnew = 6
```

```
47E1  5218        if x > 49 and x < 118 then quadnew = 7
4808  5218        if x > 117 and x < 173 then quadnew = 8
4830  5218        if x > 172 and x < 226 then quadnew = 9
4859  5218        if x > 225 then quadnew = 10
486C  5218    '
486C  5218        gosub 31200
4871  5218    '
4871  5218        return
4874  5218    '
4874  5218    31200 '
4875  5218    '
4875  5218    '   invert the proper areas
4875  5218    '
4875  5218        if initflag > 0 and quadnew = quadold then return
489A  5218    '
489A  5218    '   If not the first then clean up the old one.
489A  5218    '
489A  5218        if initflag <> 0 then get (olda, oldb) - (oldc, oldd), box
              sel: put (olda, oldb), boxsel, preset
48DA  5220    '
48DA  5220        if quadnew > 0 and quadnew < 6 then b = 183: d = 191
490B  5220        if quadnew > 5 then b = 192: d = 199
4921  5220        if quadnew = 1 then a = 0: c = 49
493A  5220        if quadnew = 2 then a = 50: c = 124
4953  5220        if quadnew = 3 then a = 125: c = 172
496C  5220        if quadnew = 4 then a = 173: c = 264
4985  5220        if quadnew = 5 then a = 265: c = 319
499E  5220        if quadnew = 6 then a = 0: c = 49
49B7  5220        if quadnew = 7 then a = 50: c = 117
49D0  5220        if quadnew = 8 then a = 118: c = 172
49E9  5220        if quadnew = 9 then a = 173: c = 225
4A02  5220        if quadnew = 10 then a = 226: c = 319
4A1B  5220    '
4A1B  5220    '   if first time through set the initial state.
4A1B  5220    '
4A1B  5220        get (a,b) - (c,d), boxsel: put (a,b), boxsel, preset
4A50  5220        olda = a: oldb = b: oldc = c: oldd = d
4A6C  5220        quadold = quadnew
4A73  5220        initflag = 1
4A7A  5220    '
4A7A  5220        return
4A7D  5220    '
4A7D  5220    31300 '
4A7E  5220    '
4A7E  5220    '   All error handler
4A7E  5220    '
4A7E  5220        message$ = "System Error, continue? Y/N [ ]"
4A87  5220        inputcol = 30
4A8E  5220        gosub 29010
4A93  5220        input;"",y$
4AA3  5220        if y$ <> "Y" and y$ <> "y" then gosub 32000
4ACB  5220        stateflag = 1
4AD2  5220        gosub 502
4AD7  5220        resume next
4ADB  5220    '
4ADB  5220    31400 '
4ADC  5220    '
```

```
4ADC  5220  '    Put up the Help screen
4ADC  5220  '
4ADC  5220       def seg = &hb000
4AE3  5220       bload "help.hlp",0
4AEC  5220       def seg
4AF0  5220  '
4AF0  5220       return
4AF3  5220  '
4AF3  5220  32000 '
4AF4  5220  '
4AF4  5220  '    Prompt for sureness....
4AF4  5220  '
4AF4  5220       message$ = "Are you sure? Y/N [ ]"
4AFD  5220       inputcol = 20
4B04  5220       gosub 29010           ' prompt
4B09  5220       input;"",y$
4B19  5220       if y$ <> "Y" and y$ <> "y" then gosub 14800: stateflag = 1
                 : gosub 502: return
4B50  5220       gosub 29000
4B55  5220  '
4B55  5220  '    return to menu
4B55  5220  '
4B55  5220       clear
4B59  5220       run "engineer.exe"
4B60  5220       end
4B64  5220
6B65  5220

22151 Bytes Available
3095 Bytes Free

0 Warning Error(s)
  0 Severe  Error(s)
```

What is claimed:

1. A process for user interactive generation and display of a geometrical figure on a graphics display screen comprising the steps of
prompting the user to choose a desired geometrical figure to be drawn on the graphics display screen from a list of geometrical figures,
prompting the user to point to a location on the graphics display screen where it is desired to generate the chosen geometrical figure, the pointing being accomplished by the user positioning a cursor on the graphics display screen at the desired location with a cursor pointing device and pressing a key to signify selection of a location,
responding to the pressing of the key by the user to signify selection of a location by removing the cursor from the graphics screen and drawing the smallest representation of the selected geometrical figure at the selected location, the user thereafter inputting a signal requesting enlargement of the geometrical figure, and
responding to the user input signal requesting enlargement of the geometrical figure by enlarging the geometrical figure in increments of one pixel until a second user input signal is received indicating the desired termination of the geometric figure expansion, and thereafter re-displaying the cursor while displaying the enlarged geometrical figure.

2. The procedure as recited in claim 1 wherein said list of geometrical figures includes a circle and a rectangle, and the user chooses a desired geometrical figure by pointing to the geometrical figure displayed in a menu on the graphics screen with the cursor and pressing said key.

3. The procedure as recited in claim 2 wherein the chosen geometrical figure is a circle and the step of pointing by the user indicates the center of the circle.

4. The procedure as recited in claim 2 wherein the chosen geometrical figure is a rectangle and the step of pointing by the user indicates a corner of the square or rectangle.

5. The procedure as recited in claim 1 wherein said cursor pointing device is a joystick and said key is a button on the joystick, the user input signal requesting enlargement of the geometrical figure being generated by pressing the joystick to one side, and the second user input signal being generated by pressing said button.

* * * * *